US012628245B2

(12) United States Patent
Leavitt et al.

(10) Patent No.: US 12,628,245 B2
(45) Date of Patent: May 12, 2026

(54) EMERGENCY DATA EXCHANGE

(71) Applicant: RapidSOS, Inc., New York, NY (US)

(72) Inventors: Lucas Richard Eager Leavitt, Forest Hills, NY (US); David Paul Sehnert, Lafayette, CO (US); Jordi Cabanas, Brooklyn, NY (US); Benjamin Taylor Harvill, III, Flushing, NY (US); Lauren Javaly, Brooklyn, NY (US)

(73) Assignee: RAPIDSOS, INC., New York, NY (US)

( * ) Notice: Subject to any disclaimer, the term of this patent is extended or adjusted under 35 U.S.C. 154(b) by 583 days.

(21) Appl. No.: 17/935,752

(22) Filed: Sep. 27, 2022

(65) Prior Publication Data

US 2023/0097022 A1 Mar. 30, 2023

Related U.S. Application Data

(60) Provisional application No. 63/248,829, filed on Sep. 27, 2021.

(51) Int. Cl.
*H04W 76/50* (2018.01)
*G06F 21/62* (2013.01)
*H04W 76/15* (2018.01)

(52) U.S. Cl.
CPC ............ *H04W 76/50* (2018.02); *G06F 21/62* (2013.01); *H04W 76/15* (2018.02)

(58) Field of Classification Search
CPC ........ H04W 76/50; H04W 76/15; G06F 21/62
USPC ........................................................ 370/329
See application file for complete search history.

(56) References Cited

U.S. PATENT DOCUMENTS

| | | | | |
|---|---|---|---|---|
| 2005/0078635 | A1 | 4/2005 | Choi | |
| 2007/0027801 | A1 | 2/2007 | Botzer | |
| 2012/0271926 | A1 | 10/2012 | Shakirzyanov | |
| 2013/0007233 | A1 | 1/2013 | Lv | |
| 2016/0117121 | A1 | 4/2016 | Bohn | |
| 2019/0287200 | A1 * | 9/2019 | Schuler | G06Q 50/265 |
| 2019/0380020 | A1 * | 12/2019 | Pellegrini | G08B 25/006 |
| 2021/0110923 | A1 * | 4/2021 | Kolaxis | H04L 67/104 |
| 2023/0008570 | A1 * | 1/2023 | Beyer | H04W 4/90 |
| 2023/0049959 | A1 | 2/2023 | Schroeder | |

(Continued)

FOREIGN PATENT DOCUMENTS

CN 102594783 B * 10/2014

OTHER PUBLICATIONS

Komutel inc. announcement, https://finance.yahoo.com/news/komutel-announces-beginning-testing-nena-130900309.html, Jun. 29, 2021 (Year: 2021).*

(Continued)

*Primary Examiner* — Xuan Lu
(74) *Attorney, Agent, or Firm* — CYGAN LAW OFFICES PC; Joseph T. Cygan

(57) ABSTRACT

Disclosed herein is an emergency response data platform (ERDP) that facilitates data exchange between various data sources and various data recipients. The ERDP may establish communication links with each of the various data sources and recipients and leverage these communication links to function as emergency data exchange between the data sources and/or recipients, for example, between different Public Safety Answering Points.

20 Claims, 14 Drawing Sheets

(56) References Cited

U.S. PATENT DOCUMENTS

2023/0412732 A1 12/2023 Chalton

OTHER PUBLICATIONS

NENA Standard for Emergency Incident Data Object (EIDO), NENA-STA-021.1-2021, (National Emergency Number Association (NENA) 2021).
NENA i3 Standard for Next Generation 9-1-1, NENA-STA-010.3b-2021, (National Emergency Number Association (NENA) 2021).
NENA Standard for the Conveyance of Emergency Incident Data Objects (EIDOs) between Next Generation (NG9-1-1) Systems and Applications, NENA-STA-024.1a-2023, (National Emergency Number Association (NENA) 2023).

* cited by examiner

EMERGENCY DATA EXCHANGE

CROSS-REFERENCE

This application claims the benefit of U.S. Provisional Application No. 63/248,829, filed Sep. 27, 2018, the contents of which is hereby incorporated herein by reference.

BACKGROUND OF THE INVENTION

A person in an emergency situation may request help using a mobile communication device such as a cell phone to dial a designated emergency number like 9-1-1 or a direct access phone number for the local emergency service provider (e.g. an emergency dispatch center). Traditionally, this call is assigned to one or more first responders by the emergency service provider, and the caller's estimated location (generally either the location of a nearby cell tower or a triangulation from the location of three or more nearby cell towers) is provided to the emergency service provider by the caller's wireless carrier (e.g., AT&T). Alternatively, the caller may provide their location to the emergency service provider by verbally speaking their location over the phone. Unfortunately, many emergency callers are unaware of their precise location or otherwise unable to verbalize it.

However, modern technologies have enabled the development and implementation of previously unimaginable or unachievable emergency services. For example, modern communication devices are capable of generating highly accurate, real-time locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. In another example, devices such as surveillance cameras can capture images, videos, or audio that can be shared in real-time with emergency management systems and emergency service providers to provide emergency service providers with situational awareness that they did not have access to in the past.

SUMMARY

Disclosed herein, in some aspects, is a method for exchanging emergency data between two or more emergency response entities (EREs), the method comprising: (a) providing an ERE relationship management portal to a first ERE and a second ERE; (b) receiving, through the ERE relationship management portal, a first set of emergency data sharing criteria regarding the second ERE from the first ERE and a second set of emergency data sharing criteria regarding the first ERE from the second ERE; (c) receiving emergency data associated with an emergency incident; (d) transmitting the emergency data associated with the emergency incident to the first ERE; (e) determining that a first portion of the emergency data associated with the emergency incident satisfies both the first and second sets of emergency data sharing criteria; and (f) in response to determining that the first portion of the emergency data associated with the emergency incident satisfies both the first and second sets of emergency data sharing criteria, autonomously transmitting the first portion of the emergency data associated with the emergency incident to the second ERE. In some embodiments, both the first and second sets of emergency data sharing criteria comprise two or more of emergency location, geofence, emergency type, emergency data type, time, and link status. In some embodiments, the first and second sets of emergency data sharing criteria comprise emergency type and link status. In some embodiments, the first ERE is a public safety answering point (PSAP) and the second ERE is one of a fire department, a police department, and an emergency medical service. In some embodiments, the emergency data associated with the emergency incident comprises an emergency location In some embodiments, further comprising identifying the first ERE as appropriate to receive the emergency data associated with the emergency incident based on the emergency location. In some embodiments, identifying the first ERE as appropriate to receive the emergency data associated with the emergency incident based on the emergency location comprises determining that the emergency location is within a geofence associated with the first ERE. In some embodiments, further comprising: (a) providing the ERE relationship management portal to a third ERE; (b) receiving, through the ERE relationship management portal, a third set of emergency data sharing criteria regarding the third ERE from the second ERE and a fourth set of emergency data sharing criteria regarding the second ERE from the third ERE; (c) determining that a second portion of the emergency data associated with the emergency incident satisfies both the third and fourth sets of emergency data sharing criteria; and (d) in response to determining that the second portion of the emergency data associated with the emergency incident satisfies both the third and fourth sets of emergency data sharing criteria, autonomously transmitting the second portion of the emergency data associated with the emergency incident to the third ERE. In some embodiments, the second portion of the emergency data associated with the emergency incident is a portion of the first portion of the emergency data associated with the emergency incident. In some embodiments, the first ERE is a PSAP, the second ERE is an emergency medical service, and the third ERE is one of a hospital and a medical insurance agency. In some embodiments, the ERE relationship management portal is a website or a web application accessible via a standard web browser. In some embodiments, further comprising providing an emergency response application to the first ERE and wherein the emergency data associated with the emergency incident is transmitted to the first ERE through the emergency response application. In some embodiments, the emergency response application comprises the ERE relationship management portal provided to the first ERE. In some embodiments, the emergency response application is a website or a web application accessible via a standard web browser. In some aspects, disclosed herein is a system comprising a processor configured to perform the method of any one of preceding embodiments. In some aspects, disclosed herein is a non-transitory computer readable storage media comprising instructions that are executable by a processor to perform the method of any one of the preceding embodiments.

In another aspect, disclosed herein is a method for exchanging emergency data between two or more emergency response entities (EREs), the method comprising: (a) providing an ERE relationship management portal to a first ERE and a second ERE; (b) receiving through the ERE relationship management portal, a first set of emergency data sharing criteria regarding the second ERE from the first ERE and a second set of emergency data sharing criteria regarding the first ERE from the second ERE; (c) receiving emergency data associated with an emergency incident from the first ERE; (d) determining that a portion of the emergency data associated with the emergency incident satisfies both the first and second sets of emergency data sharing criteria; and (e) in response to determining that the portion of the emergency data associated with the emergency incident satisfies both the first and second sets of emergency data sharing criteria, transmitting the portion of the emergency data associated with the emergency incident to the second ERE. In some embodiments, further comprising receiving a request to transmit the emergency data associated with the emergency incident to the second ERE from the first ERE. In some embodiments, wherein the request to transmit the emergency data comprises the emergency data associated with the emergency incident. In some embodiments, further comprising providing a first instance of an emergency response application to the first ERE and wherein the request to transmit the emergency data associated with the emergency incident is submitted by the first ERE through the emergency response application. In some embodiments, further comprising receiving the emergency data associated with the emergency incident and transmitting the emergency data associated with the emergency incident to the first ERE through the first instance of the emergency response application. In some embodiments, the emergency data associated with the emergency incident is generated by an electronic device associated with the emergency incident. In some embodiments, the emergency response application is a website or a web application accessible via a standard web browser. In some embodiments, the emergency response application comprises the ERE relationship management portal. In some embodiments, further comprising providing a second instance of the emergency response application to the second ERE and wherein the portion of the emergency data associated with the emergency incident is transmitted to the second ERE through the second instance of the emergency response application. In some embodiments, both the first and second sets of emergency data sharing criteria comprise two or more of emergency location, geofence, emergency type, emergency data type, time, and link status. In some embodiments, the first and second sets of emergency data sharing criteria comprise emergency type and link status. In some embodiments, further comprising: (a) receiving updated emergency data associated with the emergency incident from the first ERE; (b) determining that the updated emergency data associated with the emergency incident satisfies both the first and second sets of emergency data sharing criteria; and (c) in response to determining that the updated emergency data associated with the emergency incident satisfies both the first and second sets of data sharing criteria, transmitting the updated emergency data associated with the emergency incident to the second ERE. In some embodiments, further comprising applying a digital signature associated with the first ERE to the updated emergency data associated with the emergency incident. In some embodiments, the updated emergency data associated with the emergency incident comprises an updated incident status associated with the emergency incident. In some embodiments, further comprising generating an incident record for the emergency incident, wherein the incident record records transmission details associated with the emergency data associated with the emergency incident. In some embodiments, the transmission details comprise digital signatures associated with EREs. In some aspects, disclosed herein is a system comprising a processor configured to perform the method of any one of preceding embodiments. In some aspects, disclosed herein is a non-transitory computer readable storage media comprising instructions that are executable by a processor to perform the method of any one of the preceding embodiments.

In another aspect, disclosed herein is a method for exchanging emergency data between two or more emergency response entities (EREs), the method comprising: (a) receiving a request to share emergency data associated with an emergency incident from a first ERE to a second ERE; (b) retrieving a set of emergency data sharing criteria; (c) determining that a portion of the emergency data associated with the emergency incident satisfies the set of emergency data sharing criteria; and (d) in response to determining that the portion of the emergency data associated with the emergency incident satisfies the set of emergency data sharing criteria, transmitting the portion of the emergency data associated with the emergency incident to the second ERE. In some embodiments, further comprising receiving the set of emergency data sharing criteria through an ERE relationship management portal. In some embodiments, further comprising providing the ERE management portal to the first ERE and wherein the set of emergency data sharing criteria is submitted by the first ERE regarding the second ERE. In some embodiments, further comprising providing the ERE management portal to the first ERE and wherein the set of emergency data sharing criteria is submitted by the second ERE regarding the first ERE. In some embodiments, the ERE management portal is a website or a web application accessible via a standard web browser. In some embodiments, the set of emergency data sharing criteria comprises two or more of emergency location, geofence, emergency type, emergency data type, time, and link status. In some embodiments, the set of emergency data sharing criteria comprises emergency type and link status. In some embodiments, the request to share the emergency data associated with the emergency incident is received from a computer aided dispatch (CAD) system associated with the first ERE. In some embodiments, the portion of the emergency data associated with the emergency incident is transmitted to the second ERE through a CAD system associated with the second ERE. In some embodiments, further comprising providing an emergency response application to the first ERE and wherein the request to share the emergency data associated with the emergency incident is received through the emergency response application. In some embodiments, further comprising providing an emergency response application the second ERE and wherein the portion of the emergency data associated with the emergency incident is transmitted to the second ERE through the emergency response application. In some embodiments, the emergency response application is a website or a web application accessible via a standard web browser. In some aspects, disclosed herein is a system comprising a processor configured to perform the method of any one of preceding embodiments. In some aspects, disclosed herein is a non-transitory computer readable storage media comprising instructions that are executable by a processor to perform the method of any one of the preceding embodiments.

In another aspect, disclosed herein is a method for managing an exchange of emergency data between two or more emergency response entities (EREs), the method comprising: (a) establishing a first communication link with a first software application executed on a first computing device at a first ERE and a second communication link with a second software application executed on a second computing device at a second ERE; (b) determining a first set of emergency data sharing criteria regarding the second ERE and a second set of emergency data sharing criteria regarding the first ERE; (c) receiving emergency data from the first software application via the first communication link; (d) determining that the emergency data satisfies both the first and second sets of emergency data sharing criteria; and (e) in response to determining that the emergency data satisfies both the first and second sets of emergency data sharing criteria, transmitting the emergency data to the second software application via the second communication link. In some embodiments, the emergency data received from the first software application through the first communication link is received in the form of a single data object. In some embodiments, the emergency data received from the first software application through the first communication link is stored within a cloud-based emergency data exchange in the form of a single data object. In some embodiments, the data object is an emergency incident data object (EIDO). In some embodiments, further comprising: (a) receiving updated emergency data from the second software application via the second communication link; (b) updating the data object using the updated emergency data; and (c) transmitting the updated emergency data to the first software application via the first communication link. In some embodiments, further comprising digitally verifying the update to the data object before transmitting the updated emergency data to the first software application. In some embodiments, the second ERE is permitted to read from the data object but not permitted to write to the data object. In some embodiments, the second ERE is permitted to read from the data object and write to the data object. In some embodiments, the first set of emergency data sharing criteria regarding the second ERE permits the second ERE to write to the data object. In some embodiments, further comprising determining at least a portion of the first and second sets of emergency data sharing criteria through an ERE relationship management portal accessed by the first and second EREs. In some embodiments, at least a portion of the first set of emergency data sharing criteria regarding the second ERE is received from the first ERE through the ERE relationship management portal and wherein at least a portion of the second set of emergency data sharing criteria regarding the first ERE is received from the second ERE through the ERE relationship management portal. In some embodiments, further comprising establishing an ERE link between the first and second EREs through the ERE relationship management portal, wherein the first and second sets of emergency data sharing criteria are associated with the ERE link between the first and second EREs. In some embodiments, at least a portion of the first and second sets of emergency data sharing criteria is autonomously determined through the establishment of the ERE link between the first and second EREs. In some embodiments, establishing the ERE link between the first and second EREs through the ERE relationship management portal comprises: (a) receiving, through a first instance of the ERE relationship management portal, a request to establish an ERE link with the second ERE from the first ERE; (b) transmitting, through a second instance of the ERE relationship management portal, the request to establish the ERE link to the second ERE; and (c) receiving, through the second instance of the ERE relationship management portal, confirmation of the request to establish the ERE link from the second ERE. In some embodiments, the ERE relationship management portal is a website or a web application accessible via a standard web browser. In some embodiments, both the first and second software applications are computer aided dispatch (CAD) systems. In some embodiments, both the first and second EREs are public safety answering points (PSAPs). In some aspects, disclosed herein is a non-transitory computer readable storage media comprising instructions that are executable by a processor to perform the method of any one of the preceding embodiments.

In another aspect, disclosed herein is an emergency data exchange (EDX) system configured to facilitate an exchange of emergency data between two or more emergency response entities (EREs), the EDX system comprising a memory, a network component, and at least one processor operatively coupled to the at memory and the network component and operative to: (a) establish a first communication link with a first software application executed on a first computing device at a first ERE and a second communication link with a second software application executed on a second computing device at a second ERE; (b) determine a first set of emergency data sharing criteria regarding the second ERE and a second set of emergency data sharing criteria regarding the first ERE; (c) receive emergency data from the first software application via the first communication link; (d) determine that the emergency data satisfies both the first and second sets of emergency data sharing criteria; and (e) in response to determining that the emergency data satisfies both the first and second sets of emergency data sharing criteria, transmit the emergency data to the second software application via the second communication link. In some embodiments, further comprising: (a) a message bus; (b) a first ERE account module associated with the first ERE and configured to receive the emergency data from the first software application via the first communication link and publish the emergency data to the message bus; and (c) a second ERE account module associated with the second ERE and configured to receive the emergency data from the message bus and transmit the emergency data to the second software application via the second communication link. In some embodiments, the first set of emergency data sharing criteria is stored within the first ERE account module and wherein the second set of emergency data sharing criteria is stored within the second ERE account module. In some embodiments, further comprising a central database communicatively coupled to both the first and second ERE account modules but not communicatively coupled to the message bus and wherein the first and second sets of emergency data sharing criteria are additionally stored within the central database. In some embodiments, the first ERE account module is further configured to transmit the emergency data to the central database. In some embodiments, in the form of a single data object. In some embodiments, the single data object is an emergency incident data object (EIDO). In some embodiments, the second ERE account module is further configured to: (a) receive updated emergency data from the second software application via the second communication link; (b) retrieve the single data object from the central database; (c) update the single data object with the updated emergency data; and (d) publish the updated single data object to the message bus. In some embodiments, the central database allows the second ERE to retrieve the emergency data from the central database and update the data object with the updated emergency data based on the first and second sets of emergency data sharing criteria stored within the central database. In some embodiments, the first ERE account module is further configured to: (a) receive the updated data object from the message bus; and (b) transmit the updated data object to the first software application via the first communication link. In some embodiments, the second ERE account module is further configured to transmit the updated data object to the central database and wherein the central database is further configured to digitally verify the updated data object. In some embodiments, further comprising an ERE relationship management portal configured to determine at least a portion of the first and second sets of emergency data sharing criteria. In some embodiments, the ERE relationship management portal is a website or a web application accessible via a standard web browser.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Disclosed herein are systems, devices, media, and methods for providing enhanced emergency communications and functions. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera can provide valuable situational awareness regarding the emergency.

In one aspect, disclosed herein is an emergency data exchange (EDX) provided and facilitated by an emergency response data platform (ERDP) capable of facilitating the exchange of emergency data between emergency response entities (EREs; e.g., emergency service providers). In various embodiments, through the EDX, emergency data can be exchanged manually and autonomously. In various embodiments, through the EDX, EREs can control what emergency data they share and what emergency data they receive through the establishment of EDX links and EDX policies. By providing and facilitating the EDX, the ERDP can help make emergency response more effective and efficient.

Emergency Response Data Platform

Figure 1:
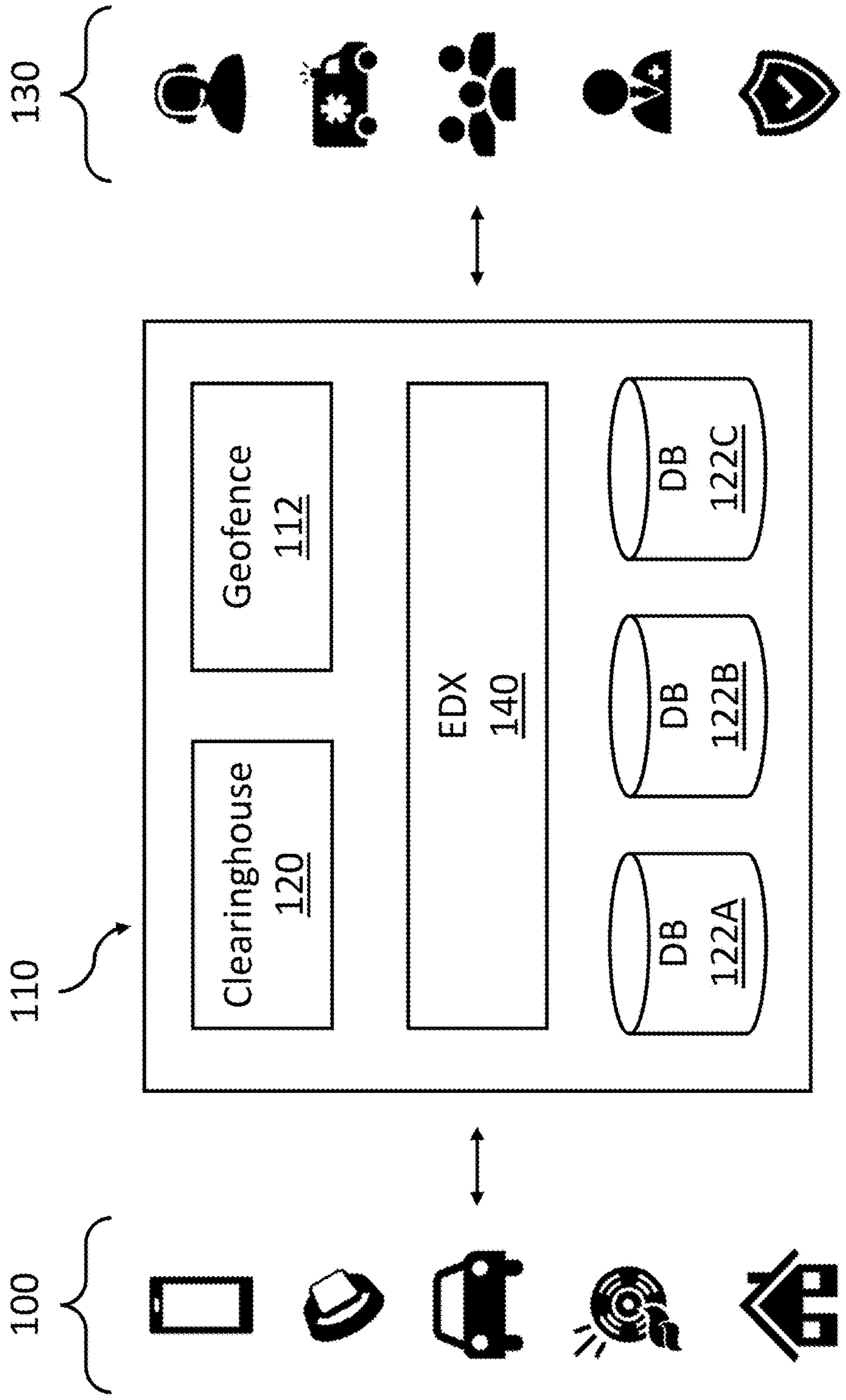
FIG. 1 depicts a diagram of an emergency response data platform (ERDP)

In various embodiments, disclosed herein are devices, systems, and methods for managing emergency data and emergency communications for more effective and efficient emergency response. FIG. 1 depicts a diagram of an emergency response data platform in accordance with one embodiment of the present disclosure. In a simple example, in some embodiments, an emergency data source 100 transmits emergency to an emergency response data platform (ERDP) 110 before, during, or after an emergency, and the emergency response data platform shares the emergency data with an emergency service provider (ESP) 130. The ESP 130 can then use the emergency data to more efficiently and effectively respond to corresponding emergencies. In some embodiments, the emergency data source 100 is a third-party server system (hereinafter, "third-party server"). For example, in some embodiments, the emergency data source 100 is a third-party server (e.g., a backend server system) of a technology company that produces software for electronic devices, such as Apple or Google. In some embodiments, the emergency data source 100 is an electronic device. For example, the emergency data source 100 may be a communication device (e.g., a walkie talkie or two-way radio, a mobile or cellular phone, a computer, a laptop, etc.), a wearable device (e.g., a smartwatch), or an Internet of Things (IoT) device such as a home assistant (e.g., an Amazon Echo) or a connected smoke detector (e.g., a Nest Protect smoke and carbon monoxide alarm). In some embodiments, an electronic device includes a display, a processor, a memory (e.g., an EPROM memory, a RAM, or a solid-state memory), a network component (e.g., an antenna and associated components, Wi-Fi adapters, Bluetooth adapters, etc.), a data storage, a user interface, an emergency alert program, one or more location components, and one or more sensors. In some embodiments, the processor is implemented as one or more microprocessors, microcomputers, microcontrollers, digital signal processors, central processing units, state machines, logic circuitries, and/or devices that manipulate signals based on operational instructions. Among other capabilities, the processor is configured to fetch and execute computer-readable instructions stored in the memory.

In some embodiments, the display is part of the user interface (e.g., a touchscreen is both a display and a user interface in that it provides an interface to receive user input or user interactions). In some embodiments, the user interface includes physical buttons such as an on/off button or volume buttons. In some embodiments, the display and/or the user interface comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage includes a location data cache and a user data cache. In some embodiments, the location data cache is configured to store locations generated by the one or more location components.

In some embodiments, the emergency alert program is a web application or mobile application. In some embodiments, the emergency alert program is configured to record user data, such as a name, address, or medical data of a user associated with the electronic device. In some embodiments, the emergency alert program is configured to detect when an emergency request is generated or sent by the electronic device (e.g., when a user uses the electronic device to make an emergency call). In some embodiments, in response to detecting an emergency request generated or sent by the electronic device, the emergency alert program is configured to deliver a notification to the ERDP 110. In some embodiments, the notification is an HTTP post containing information regarding the emergency request. In some embodiments, the notification includes a location (e.g., a device-based hybrid location) generated by or for the electronic device. In some embodiments, in response to detecting an emergency request generated or sent by the electronic device, the emergency alert program is configured to deliver user data to the ERDP 110.

In some embodiments, the emergency response data platform (ERDP) 110 includes an ERDP operating system, an ERDP CPU, an ERDP memory unit, an EMS communication element, and one or more software modules. In some embodiments, the ERDP CPU is implemented as one or more microprocessors, microcomputers, microcontrollers, digital signal processors, central processing units, state machines, logic circuitries, and/or devices that manipulate signals based on operational instructions. Among other capabilities, the ERDP CPU is configured to fetch and execute computer-readable instructions stored in the ERDP memory unit. The ERDP memory unit optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ERDP memory unit optionally includes modules, routines, programs, objects, components, data structures, etc., which perform particular tasks or implement particular abstract data types.

In some embodiments, the ERDP 110 includes one or more ERDP databases, one or more servers, and a clearinghouse 120. In some embodiments, the clearinghouse 120, as described in further detail below, is an input/output (I/O) interface configured to manage communications and data transfers to and from the ERDP 110 and external systems and devices. In some embodiments, the clearinghouse 120 includes a variety of software and hardware interfaces, for example, a web interface, a graphical user interface (GUI), and the like. The clearinghouse 120 optionally enables the ERDP 110 to communicate with other computing devices, such as web servers and external data servers. In some embodiments, the clearinghouse 120 facilitates multiple communications within a wide variety of networks and protocol types, including wired networks, for example, LAN, cable, etc., and wireless networks, such as WLAN, cellular, or satellite. In some embodiments, the clearinghouse 120 includes one or more ports for connecting a number of devices to one another or to another server. In some embodiments, the clearinghouse 120 includes one or more sub-clearinghouses, such as location clearinghouse and additional data clearinghouse, configured to manage the transfer of locations and additional data, respectively. In some embodiments, the ERDP 110 additionally includes a user information module that receives and stores user information (e.g., personal information, demographic information, medical information, location information, etc.) within the ERDP 110. In some embodiments, users can submit user information through a website, web application, or mobile application, such as during a registration process for an emergency response application. In some embodiments, when the ERDP 110 receives emergency data including user information, such as through an emergency alert received by the clearinghouse 120 (as described below), the ERDP 110 stores the user information in the user information module. In some embodiments, user information stored within the user information module is received by the ERDP 110 from a third-party server system, as described above. In some embodiments, user information stored within the user information module is associated with an identifier of a user or an electronic device associated with a user, such as a phone number or an email address. APIs may be used to query data from the clearinghouse. For example, LIS App for querying location information and ADR App for querying additional data about an emergency. A query from an ESP agency may be received via such API and the response will be returned in response to the query and may be displayed within the GUI at the ESP.

As mentioned above, in some embodiments, the emergency response data platform (ERDP) 110 shares emergency data with an emergency service provider (ESP) 130. In some embodiments, an ESP 130 (e.g., a public safety answering point (PSAP)) is a system that includes one or more of a display, a user interface, at least one central processing unit or processor, a network component, an audio system, (e.g., microphone, speaker and/or a call-taking headset), and an ESP application (e.g., a computer program) such as a computer aided dispatch (CAD) program or an emergency call taking program (also referred to as customer premise equipment or CPE). In some embodiments, the ESP application comprises a database of emergency responders, such as medical assets, police assets, fire response assets, rescue assets, safety assets, etc. In some embodiments, the ESP application is an emergency response application provided by the ERDP 110, as described below. In some embodiments, the ESP application is installed on a computing device at the ESP 130 and comprise one or more software modules, such as a call taking module, an ESP display module, a supplemental or updated information module, or a combination thereof. In some embodiments, the ESP application displays the information on a map (e.g., on the display). In some embodiments, the ESP application is accessible or executable on mobile devices associated with ESP 130, such as first responder devices. In some embodiments, the ESP application is an emergency response application provided by the ERDP 110, as described below. In some embodiments, the ERDP 110 includes an emergency data exchange module 140 that functions to provide and facilitate an emergency data exchange (EDX) that facilitates the exchange of emergency data between emergency response entities (e.g., ESPs), as described below.

Emergency Clearinghouse

In some embodiments, as mentioned above with respect to FIG. 1, the emergency response data platform (ERDP) 110 includes a clearinghouse 120 (also referred to as an "Emergency Clearinghouse") for receiving, storing, retrieving, and transmitting emergency data. In some embodiments, as depicted by FIG. 1, through the clearinghouse 120, the ERDP 110 can receive emergency data from an emergency data source 100 (as described above) and transmit the emergency data to an emergency data recipient, such as an emergency service provider (ESP) 130 (as described above). In this way, the ERDP 110 acts as a data pipeline between emergency data sources 100 and ESPs 130. The emergency data that passes through the clearinghouse 120 may include (but is not limited to) location data (e.g., fixed addresses or device-based hybrid locations generated in real time) and additional data (e.g., medical history, personal information, or contact information, etc.). In some embodiments, through the clearinghouse 120, the ERDP 110 transmits emergency data to ESPs 130 to aid the ESPs 130 in responding to emergencies. For example, location data may allow emergency responders to arrive at the scene of an emergency faster, and additional data may allow emergency responders to be better prepared for the emergencies that they face.

The clearinghouse 120 may receive emergency data in various ways. For example, in some embodiments, an emergency data source 100 can unilaterally transmit emergency data to the clearinghouse 120. For example, in one embodiment, an emergency alert is triggered by an electronic device manually (e.g., in response to the selection of a soft or hard emergency button) or automatically based on sensor data received by the electronic device (e.g., smoke alarms). The electronic device can then transmit the emergency alert and any associated data to the ERDP 110, such as to an endpoint provided by the clearinghouse 120. Or, for example, in one embodiment, after an emergency alert is received by the ERDP 110 from a first emergency data source, the ERDP 110 can query a second emergency data source for emergency data (e.g., emergency data associated with the emergency alert received from the first emergency data source). For example, the emergency alert received from the first emergency data source may include a user identifier (e.g., a telephone number or an email address) for an owner or user of the first emergency data source. The ERDP 110 can then query the second emergency data source with the user identifier to retrieve additional emergency data associated with the owner or user of the first emergency data source. In some embodiments, emergency data received by the ERDP 110 is received in a format that is compatible with industry standards for storing and sharing emergency data. In some embodiments, the ERDP 110 formats emergency data that it receives into a format that is compatible with industry standards. For example, in some embodiments, the emergency data is formatted to be compatible with National Emergency Number Association (NENA) standards. In some embodiments, emergency data is formatted by the ERDP 110 to be compliant with the Presence Information Data Format Location Object (PIDF-LO) standard. In some embodiments, emergency data (or emergency call data, as described below) is formatted by the ERDP to be compliant with the Emergency Incident Data Object (EIDO) standard. In some embodiments, emergency data received by the ERDP 110 is stored within one or more databases 122. In some embodiments, emergency data received by the ERDP 110 is associated with one or more identifiers, such as a device or user identifier.

The clearinghouse 120 may share emergency data in various ways. For example, in some embodiments, an emergency data recipient, such as an ESP 130, can query the ERDP 110 for emergency data. For example, in some embodiments, an ESP 130 can query the ERDP 110 with an emergency data request including a user identifier (e.g., a telephone number or an email address) to receive emergency data gathered or received by the ERDP 110 associated with the user identifier. Or for example, in some embodiments, an ESP 130 can query the ERDP 110 with a geospatial area to receive emergency data gathered or received by the ERDP 110 associated with the geospatial area. Alternatively, in some embodiments, the ERDP 110 can autonomously transmit emergency data to an emergency data recipient without first receiving a query from the emergency data recipient (also referred to as "pushing" emergency data, as opposed to emergency data being "pulled" with a query). In some embodiments, the ERDP 110 pushes emergency data to an emergency data recipient using an emergency data subscription system. Using the emergency data subscription system, an emergency data recipient can subscribe to the clearinghouse 120 for a particular device identifier, user identifier, ESP account, or geospatial area. After subscribing to a subscription, the emergency data recipient may automatically receive updates regarding the subscription without first sending a query for emergency data. For example, if an ESP 130 subscribes to a phone number, whenever the ERDP 110 receives updated emergency data associated with the phone number, the clearinghouse 120 can instantly and automatically transmit the updated emergency data associated with the phone number to the ESP 130.

Emergency Data Geofencing

In some embodiments, a geofence system 112 is applied to egress from the clearinghouse 120 or the ERDP 110 to protect sensitive emergency data from being shared with unintended recipients. For example, the geofence system 112 may check the authorization of a requesting agency to see if the emergency location is within the jurisdictional area of the requesting agency. As depicted in FIG. 1, in some embodiments, when emergency data (e.g., an emergency location or additional data) is received by the ERDP 110 from an emergency data source 100 (ingress data), the emergency data is first filtered via the geofence system 112 before being ingested by the clearinghouse 120 (not shown). Similarly, in some embodiments, when a query 117 for emergency data is received by the ERDP 110 from an emergency data recipient (e.g., an ESP 130), the query is processed by the geofence system 112 before response 119 emergency data is transmitted to the emergency data recipient. In some embodiments, the query 117 comprising a user identifier (e.g., a phone number) is sent to a location app (e.g., LIS App 114), where the response 119 comprising a location (e.g., latitude/longitude coordinates, an address) of an emergency. Although not shown, queries may be sent to an additional data app (e.g., ADR app) for additional information (e.g., user data, medical data, sensor data) about an emergency.

Generally, a geofence is a virtual perimeter that represents a real-world geographic area. A geofence can be dynamically generated—as in a radius around a point location—or a geofence can be a predefined set of boundaries (such as school zones or neighborhood boundaries). For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

In some embodiments, the ERDP 110 maintains a geofence database including one or more geofences associated with each ESP 130 that is or has ever been communicatively coupled to the ERDP 110. In some embodiments, a geofence associated with an ESP 130 may be submitted to the ERDP 110 by an administrator of the ESP 130, such as through an emergency response application (as described below) or via email. In some embodiments, when emergency data is received by the ERDP 110 the ERDP 110 identifies a location associated with the emergency data (e.g., an emergency location included in an emergency alert) and determines if the location is within the combined authoritative jurisdiction (i.e., within any one of the geofences stored in the geofence database). In some embodiments, if the location is not within the combined authoritative jurisdiction, the ERDP 110 rejects or drops the emergency data (also referred to as "ingress filtering"). In some embodiments, when the ERDP 110 receives a query for emergency data from an ESP 130, the ERDP 110 identifies a geofence associated with the ESP 130 and returns only emergency data associated with locations that are within the geofence associated with the ESP 130 (also referred to as "egress filtering). In some embodiments, geofences are used in routing emergency data that is pushed to an emergency data recipient. In some embodiments, example, as mentioned above, an emergency data recipient may subscribe to a geofence. Then, when the ERDP 110 receives emergency data associated with a location that is within the geofence to which the emergency data recipient has subscribed, the ERDP 110 can instantly and automatically push the emergency data to the emergency data recipient.

Emergency Response Application

As mentioned above, in some embodiments, data and information is shared between the emergency response data platform (ERDP) and an emergency service provider (ESP) through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the ERDP). In some embodiments, the emergency response application functions to both facilitate a two-way communication link between the ERDP and the ESP and visualize data (e.g., emergency data) received by the ESP from the ERDP. The emergency response application optionally includes various components, such as a frontend application (hereinafter "graphical user interface" or "GUI"), a backend application, an authorization module, and a user database. In some embodiments, the emergency response application additionally or alternatively includes a credential management system or a geofence system (which may include or be otherwise communicatively coupled to a credentials database or a geofence database). In some embodiments, the credential management system and the geofence system are external to the emergency response application and communicatively coupled to the emergency response application (e.g., the credential management system or geofence system can be housed or hosted on a cloud computing system by the ERDP). Any or all of the components of the emergency response application may be hosted on a cloud computing system by the ERDP, a computing device at an ESP, or some combination thereof.

In some embodiments, the emergency response application is a webpage or web application that can be accessed through an internet or web browser. In such embodiments, the emergency response application can be quickly and easily integrated into the systems used by emergency service providers (ESPs), such as public safety answering points (PSAPs), because accessing and using emergency response application requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application to PSAPs in the form of a webpage accessible through a standard web browser, in order to provide the potentially life-saving information stored within the clearinghouse to those capable of providing emergency assistance as quickly and easily as possible. However, in some embodiments, the emergency response application is a software application installed on a computing device at an ESP. The emergency response application may be provided by the ERDP or by a third-party.

Figure 2:
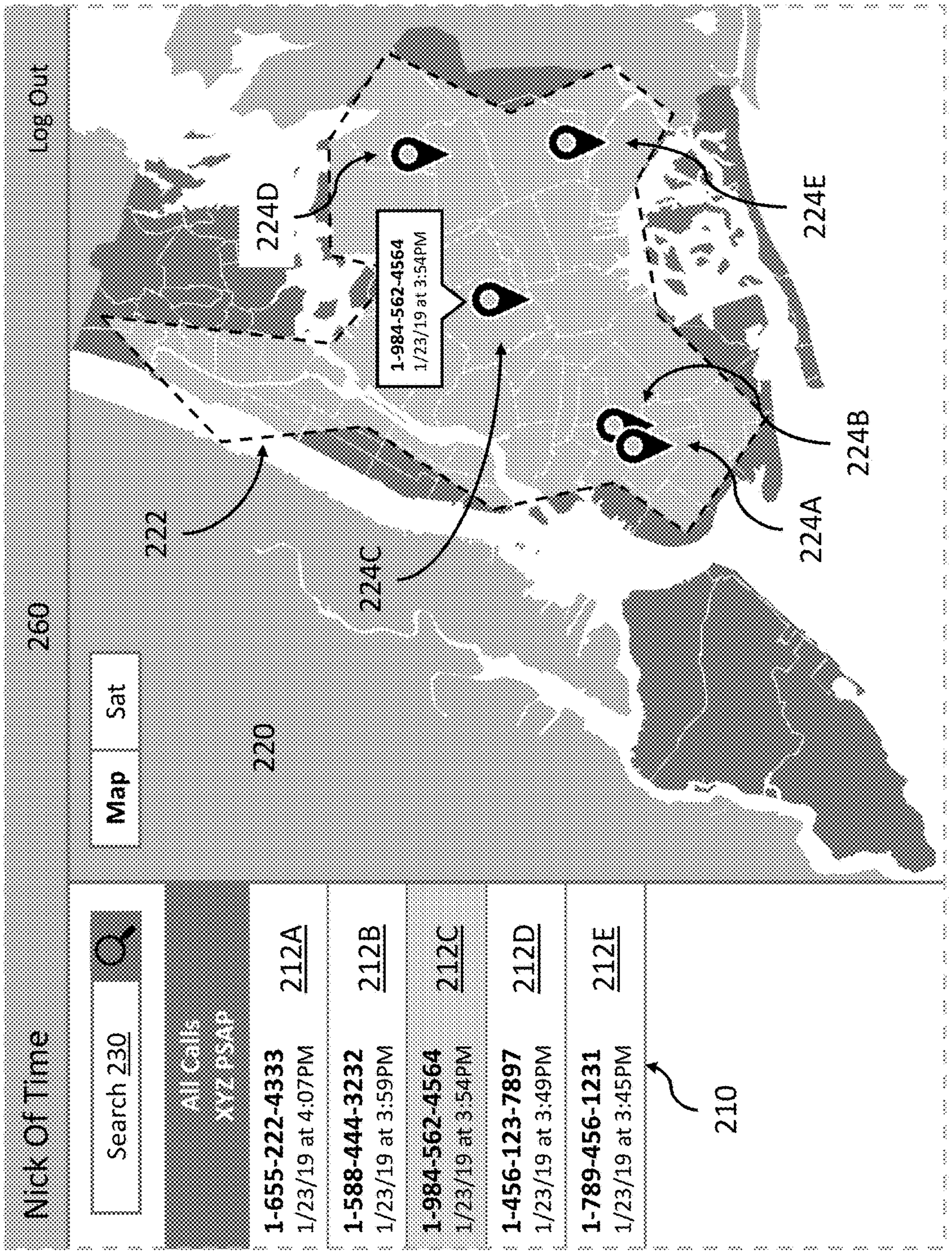
FIG. 2 illustrates an embodiment of a graphical user interface (GUI) provided by an emergency response application.

FIG. 2 illustrates a graphical user interface (GUI) provided by an emergency response application 260, in accordance with some embodiments. In some embodiments, the GUI provides interactive elements that allow a user at an ESP to receive data from the ERDP, visualize data received from the ERDP, and transmit data to the ERDP. For example, in some embodiments, the GUI includes an entry field 230 through which a user can submit a device identifier, such as by typing or pasting the device identifier into the entry field 230. In some embodiments, after submitting a device identifier through the entry field 230, the user can prompt the emergency response application to generate and send an emergency data request by selecting a search button. The emergency response application 260 then generates an emergency data request including the device identifier and any other necessary information (e.g., a temporary access token) and transmits the emergency data request to the ERDP. The ERDP can then return any available emergency data associated with the device identifier to the emergency response application 260, as described above and below. In another example, in some embodiments, the emergency response application 260 can automatically receive emergency data from the ERDP for emergencies relevant to an ESP (e.g., emergencies located within the jurisdiction of the ESP) without requiring a user to generate an emergency data request, as described above and below. After receiving emergency data from the ERDP, the emergency response application 260 can then visualize the emergency data within the GUI of the emergency response application 260. For example, in some embodiments, the emergency response application 260 includes a list of incidents 210 and an interactive map 220, as illustrated by FIG. 2. As shown, an example display at a PSAP is depicted with two queues—one queue may show calls coming into the PSAP ("All Calls") and another queue specific to the call taker/dispatcher position "My Calls." In some embodiments, when the emergency response application 260 receives a location (e.g., an emergency location) and a device identifier associated with an emergency occurring within the jurisdiction 222 of the receiving ESP, the emergency response application 260 displays the location associated with the emergency within the interactive map 220 as a location marker 224 (also referred to as an "incident location") and displays the device identifier associated with the emergency within the list of incidents 210 as an incident 212.

In addition to emergency locations, the emergency response application 260 can receive and visualize numerous types of emergency data from the ERDP. For example, the emergency response application 260 can receive additional data regarding an emergency, such as demographic or medical data associated with a person involved in the emergency (e.g., an emergency caller). In another example, the emergency response application 260 can receive data from sensors associated with the emergency, such as heart-rate data collected by a sensor on an emergency caller's smartwatch. Or, for example, the emergency response application 260 can receive data regarding emergency response assets available for an emergency, as described below. In some embodiments, the emergency response application receives and visualizes messages received from emergency callers or other ESPs, as described below. The emergency response application 260 can visualize any emergency data received from the ERDP within the GUI of the emergency response application.

Emergency Data Transmission

Figure 3A:
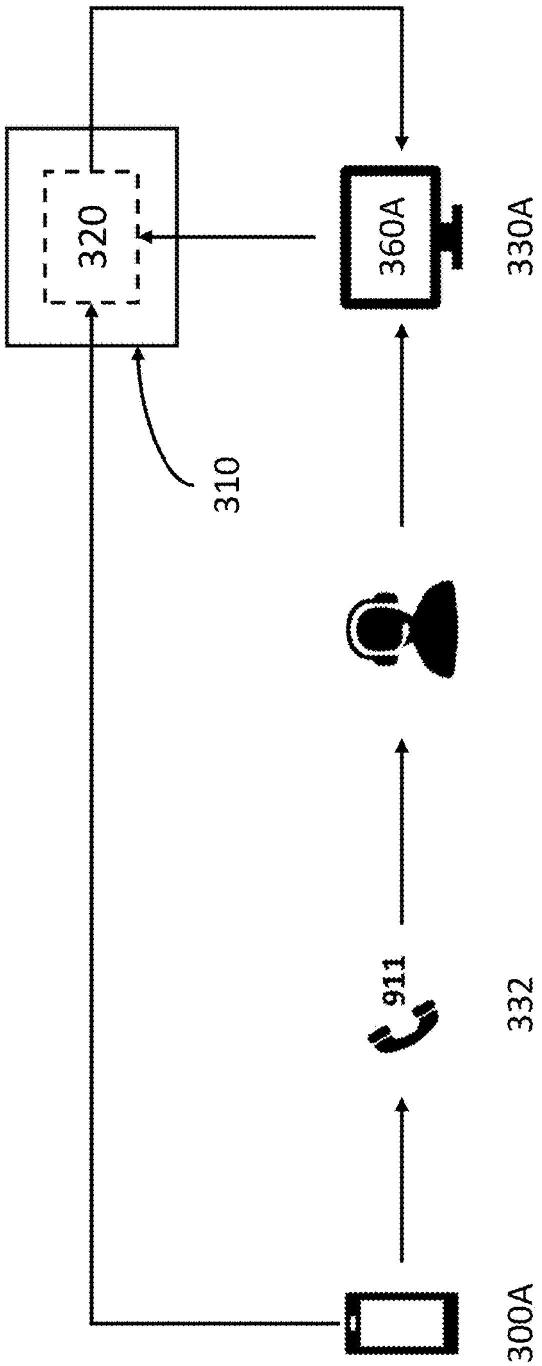
FIG. 3A and FIG. 3B depict systems and processes for receiving and transmitting emergency data by an emergency response data platform.
Figure 3B:
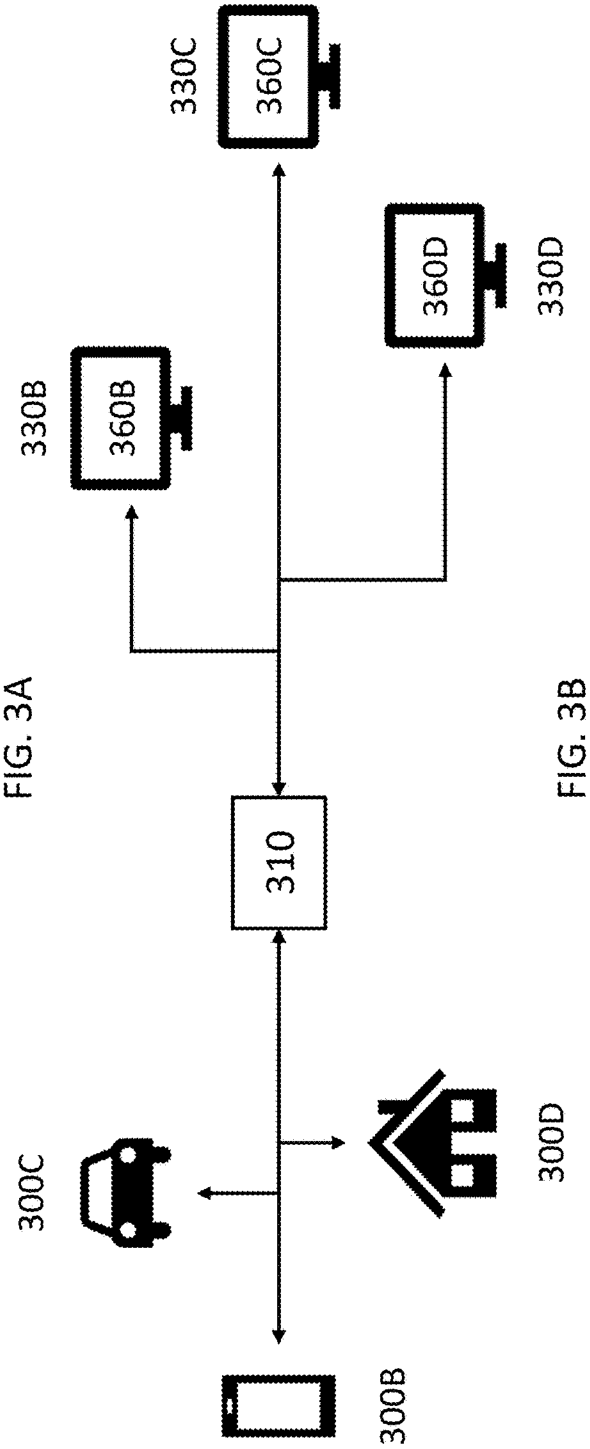

FIGS. 3A and 3B depict systems and processes for receiving and transmitting emergency data by an emergency response data platform, in accordance with some embodiments of the present disclosure. As described above, in some embodiments, an emergency response data platform (ERDP) maintains a clearinghouse that obtains and shares emergency data to aid emergency service providers (ESPs) in responding to emergencies via queries and responses as shown in FIG. 1. In another example, as depicted in FIG. 3A, during an emergency, an ESP 330A can send a query for emergency data (also referred to as an "emergency data request") to the ERDP 310 (e.g., through an emergency response application 360A, as described above) for a particular emergency, and, in response, the ERDP 310 can send any available emergency data associated with the emergency back to the ESP 330A (such as through emergency response application 360A). In some embodiments, as described above, the emergency response application 360A includes an identifier associated with an emergency alert in the emergency data request. The ERDP 310 can then use the identifier associated with the emergency alert to retrieve emergency data associated with the emergency alert from the clearinghouse 320. For example, as described above, an ESP 340A (e.g., a public safety answering point (PSAP)) can receive an emergency alert in the form of a 9-1-1 phone call 332 (representative of an emergency or potential emergency) from a mobile phone 300A associated with a phone number (e.g., (555) 555-5555). The ESP 330A can then send an emergency data request including the phone number (i.e., the identifier associated with the emergency alert) to the ERDP 310, which can then retrieve any emergency data within the clearinghouse 320 associated with the phone number and return the available emergency data to the requesting ESP 330A. This process of returning emergency data to an ESP in response to an emergency data request is referred to as "pulling" emergency data from the clearinghouse.

As described above, in some embodiments, the emergency response data platform (ERDP) can "push" emergency data from the Emergency Clearinghouse to emergency service providers (ESPs), such as by using an emergency data subscription system (hereinafter, "subscription system"). FIG. 3B depicts a flow diagram of a process for pushing emergency data from the Emergency Clearinghouse to one or more ESPs. In some embodiments, a member of an ESP (e.g., a PSAP staff member) logs into the emergency response application 360B at an ESP system 330B (e.g., a computing device associated with the ESP) by accessing the emergency response application 360B (e.g., by navigating to the emergency response application 360B through a web browser) and submitting their login information through the GUI of the emergency response application 360B. In some embodiments, when the ESP member logs into the emergency response application 360B by submitting their login information, the emergency response application 360B or ERDP 310 then determines an ESP account ID associated with the ESP member's account and establishes a persistent or active communication link (e.g., a websocket connection) with the ESP system 330B, thereby automatically subscribing the ESP console to the ESP account ID for the duration of their login session. Then, as described above, when the ERDP 310 receives an emergency alert including a location (e.g., when an emergency call is made from an communication device 300B and sends an emergency alert to the ERDP 310 including a location generated by the communication device 300B), the ERDP 310 retrieves a geofence associated with every ESP registered with the ERDP 310 and determines if the location falls within any of the geofences. In response to determining that the location falls within a geofence associated with the ESP associated with the ESP account ID, the ERDP 310 then associates the location with the ESP account ID, determines if there are any active or persistent communication links between the ERDP 310 and any computing devices subscribed to the ESP account ID. In this instance, because the ESP system 330B is subscribed to the ESP account ID and actively linked to the ERDP 310 through the persistent or active communication link, the ERDP 310 automatically pushes (e.g., from the clearinghouse) the emergency alert or emergency data associated with the emergency alert (e.g., the location, a phone number, etc.) to the ESP system 330B for display within the emergency response application 360B. In some embodiments, emergency alerts or emergency data associated with emergency alerts that have been pushed to an ESP are displayed within a jurisdictional awareness view, as described below.

For example, ESP system 330B and ESP system 330C are two different ESP consoles associated with the same ESP (e.g., two computing devices at the same public safety answering point (PSAP)), PSAP A. ESP system 330D is associated with a second ESP, PSAP B. One day, PSAP call-takers access and successfully log into the emergency response application 360 (emergency response application 360D-360D) at each of the three ESP system (ESP systems 330B-330D), thereby establishing three separate active communication links, one active communication link between the ERDP 310 and each of the three ESP consoles. The ESP consoles are automatically subscribed by the ERDP 310 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the ERDP 310 with their respective ESP account IDs (e.g., during a registration process for the emergency response application).

Later that day, an emergency call is made from communication device 300B, which causes communication device 300B to generate a first emergency alert including a first location of the communication device 300B and transmit the first emergency alert to the ERDP 310. When the ERDP 310 receives the first emergency alert, the ERDP 310 retrieves some or all of the geofences stored within the ERDP 310 and determines if the first location falls within any of the geofences stored within the ERDP 310. In this example, the ERDP 310 determines that the first location falls within geofence A, associated with PSAP A. In response, the ERDP 310 tags the first location with the ESP account ID associated with geofence A, ESP ID A. The ERDP 310 then determines if there are any active communication links between the ERDP and any ESP consoles subscribed to ESP ID A and automatically pushes (e.g., from the clearinghouse) the first emergency alert to those ESP consoles. In this example, both ESP system 330B and ESP system 330C are subscribed to ESP ID A, so the ERDP 310 automatically pushes the first emergency alert to both ESP system 330B and ESP system 330C for display within emergency response applications 360B and 360C, respectively, such as through a jurisdictional awareness view (as described below). The first location does not fall within geofence B, because geofence A and geofence B do not overlap, so the first emergency alert is not pushed to ESP system 330D, even though an active communication link has been established between the ERDP 310 and ESP system 330D.

Three minutes later, the ERDP 310 receives an emergency alert from electronic device 300D (e.g., a home security system) including a second location of the electronic device 300D. When the ERDP 310 receives the second emergency alert, the ERDP again retrieves some or all of the geofences stored within the ERDP 310 and determines if the second location falls within any of the geofences stored within the ERDP 310. In this example, the ERDP 310 determines that the second location falls within geofence B, associated with PSAP B. In response, the ERDP 310 tags the second location within the ESP account associated with geofence B, ESP ID B and automatically pushes the second emergency alert to ESP system 330D for display within emergency response application 360D, because ESP system 330D has an active communication link established with the ERDP 310 and ESP system 330D is subscribed to ESP ID B. The ERDP 310 does not push the second emergency alert to ESP system 330B or ESP system 330C. Although ESP system 330B and ESP system 330C have active communication links established with the ERDP 310, they are not subscribed to ESP ID B, and geofence A and geofence B do not overlap, meaning the second location does not fall within geofence A. Two minutes after that, the ERDP 310 receives an emergency alert from electronic device 300C (e.g., an intelligent vehicle system) including a third location of the electronic device 300C. The ERDP 310 determines that the third locations falls within geofence A (like the first location included in the first emergency alert) and thus automatically pushes the third emergency alert to both ESP system 330B and ESP system 330C for display within emergency response application 360B and 360C. In some embodiments, emergency response application 360B and emergency response application 360C display the first emergency alert and the third emergency alert simultaneously, such as through a jurisdictional awareness view, as described below.

Jurisdictional Awareness View

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. FIG. 2 illustrates the jurisdictional awareness view displayed within the emergency response application, in accordance with one embodiment of the present disclosure. In some embodiments, the jurisdictional awareness view includes one or more lists of incidents 210 that displays one or more incidents 212 associated with one or more device identifiers (e.g., phone numbers, IP addresses). Here, the display includes two lists—one includes all calls received by an agency and another one is for the calls received by a particular position (which is a subset of all calls queue). In some embodiments, the jurisdictional awareness view additionally or alternatively includes an interactive map 220 that displays one or more incident locations 224 associated with the one or more incidents 212 associated with the one or more device identifiers, as described below. In some embodiments, the jurisdictional awareness view displays incidents and incident locations only for emergencies occurring within the jurisdiction 222 of the ESP at which the emergency response application 260 is being accessed.

For example, in the example illustrated in FIG. 2, an ESP has accessed an emergency response application 260 provided by the ERDP. In this example, the ERDP has pushed emergency data associated with five different emergency alerts to the ESP (as described above) through the emergency response application 260. Accordingly, the emergency response application 260 displays five different incidents 212 (e.g., incidents 212A-212E) within the list of incidents 210 and five corresponding incident locations 224 (e.g., incident locations 224A-224E) within the interactive map 262. As illustrated by FIG. 2, in some embodiments, incidents 212 and incident locations 224 may be selected or hovered over to highlight a particular incident 212. In this example, incident 212C and its corresponding incident location 224C have been selected and highlighted. In some embodiments, selecting a particular incident 212 or corresponding incident location 224 prompts the emergency response application 260 to display additional information associated with the particular incident 212 (e.g., additional emergency data or information associated with the emergency alert for which the particular incident 212 was created) within a single-incident view that displays only emergency data associated with the particular incident (as described below). Because the jurisdictional awareness view can show an ESP numerous incidents 212 occurring within the jurisdiction 222 of the ESP simultaneously, the jurisdictional awareness view can provide the ESP with situational awareness that the ESP otherwise would not have. For example, with the knowledge that incidents 212A and 212B originated in close proximity and at approximately the same time, an ESP personnel (e.g., a call taker at a public safety answering point) can determine that the two incidents may be related.

Emergency Data Exchange

As mentioned above, in various embodiments, an emergency response data platform (ERDP) facilitates an emergency data exchange (EDX) through which emergency data can be received and transmitted from various data sources and to various data recipients. In various embodiments, through the EDX, an emergency data sharing relationship (also referred to as an "EDX link") can be established between a particular data source and a particular data recipient, as described below. In some embodiments, as described below, the EDX link governs the exchange of emergency data between the data source and the data recipient. In various embodiments, through the EDX, emergency data can be exchanged manually (e.g., actively; such as when a particular data source selects, through a graphical user interface, a particular bit of emergency data to share with a particular data recipient with whom the data source has established an EDX link) or automatically (e.g., passively; such as when an EDX link established between a particular data source and a particular data recipient stipulates that emergency data generated by the data source is to be made available to the data recipient by default), as described below. In various embodiments, through the EDX, emergency data sharing criteria (also referred to as "EDX policies") are generated and associated with EDX links, as described below. In some embodiments, as described below, EDX policies specifically define when and how emergency data generated by a particular data source is to be made available to a particular data recipient. In various embodiments, the EDX maintains detailed records of when and how particular bits of emergency data are shared and accessed by particular data sources and particular data recipients, as described below. As described below, by providing and facilitating an EDX, the ERDP can improve interoperability between emergency response stakeholders.

Figure 4:
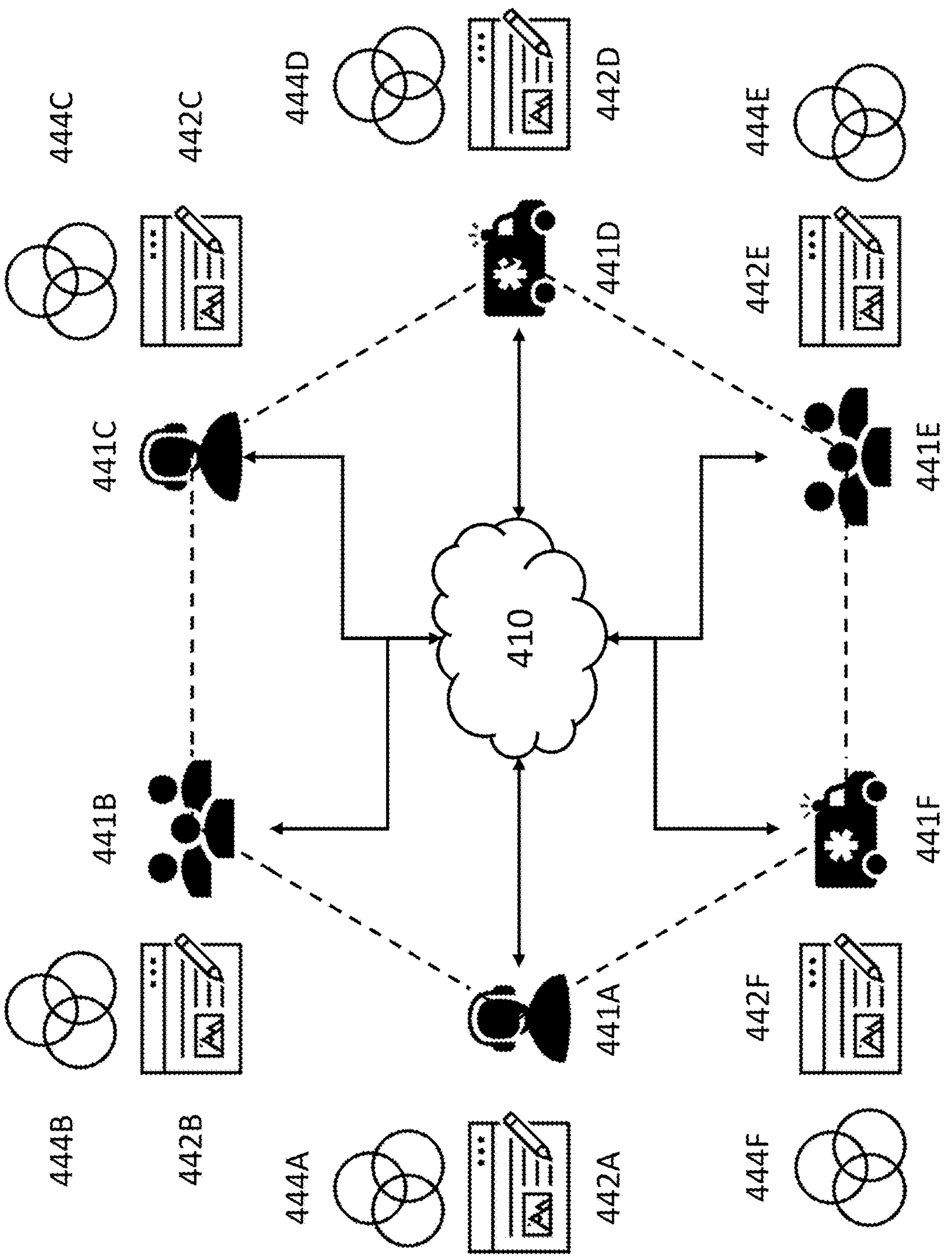
FIG. 4 depicts a diagram of an emergency data exchange (EDX) facilitated by an ERDP.

FIG. 4 depicts a diagram of an emergency response data platform (ERDP) providing and facilitating an emergency data exchange (EDX), in accordance with some embodiments of the present disclosure. As depicted in FIG. 4, the ERDP 410 is communicatively coupled to a plurality of different emergency response entities (EREs; e.g., any entity interested in sharing or receiving emergency data, which may include emergency service providers such as PSAPs and fire departments, as well as non-emergency service providers such as medical insurance providers and towing companies) 441. In the example depicted in FIG. 4, the ERDP 410 is communicatively coupled to two PSAPs (EREs 441A and 441C), two medical insurance providers (EREs 441B and 441E), and two emergency medical services (EREs 441D and 441F). Through the EDX, the ERDP 410 can facilitate the exchange of emergency data from any one of the EREs 441 communicatively couped to the ERDP 410 to any of the other EREs 441 communicatively coupled to the ERDP 410. For example, through the EDX, PSAP 441A can share emergency data with PSAP 441C, or with medical emergency service 441D. Or for example, through the EDX, emergency medical service 441D can share emergency data with medical insurance provider 441B, or with emergency medical service 441F. In this way, the EDX provides a communication network to each of the EREs 441 communicatively coupled to the ERDP 410. In some embodiments, as described below, the EDX receives and transmits emergency data from and to EREs in a common format. For example, in some embodiments, the common format is the Emergency Incident Data Object (EIDO) standard. In some embodiments, an EIDO is a JSON-based (JavaScript Object Notation) data object that is used to share emergency incident information between and among authorized entities and systems according to the EIDO standard adopted by the National Emergency Number Association (NENA).

In some embodiments, as mentioned above, in order to send or receive emergency data through the EDX, an ERE 441 must first establish an emergency data sharing relationship (e.g., an EDX link) with another ERE 441. In some embodiments, an ERE 441 may only send or receive emergency data to or from another ERE 441 with whom the ERE 441 has previously established an emergency data sharing relationship with. In some embodiments, an ERE 441 can establish an emergency data sharing relationship (hereinafter, an "EDX link") with another ERE 441 through an ERE relationship management portal 442, as described below. In some embodiments, as mentioned above, in order to send or receive emergency data through the EDX, an ERE 441 must first establish a set of emergency data sharing criteria 444 (e.g., one or more EDX policies). In some embodiments, a set of emergency data sharing criteria 444 may specify, for example, which other EREs 441 that the ERE 441 that established the set of emergency data sharing criteria 444 consents to send emergency data to or accept emergency data from, the types of emergency data that the ERE 441 that established the set of emergency data sharing criteria 444 consents to send or receive, or under which circumstances the ERE 441 that established the set of emergency data sharing criteria 444 consents to send or receive emergency data. However, a set of emergency data sharing criteria 444 may include any other criteria. In some embodiments, an emergency data sharing criteria 444 (hereinafter, an "EDX policy") may be established through an ERE relationship management portal 442, as described below. In some embodiments, when an EDX link is established between two EREs 441, the EDX link is associated with a default set of EDX policies 441, as described below. In some embodiments, as described below, before the ERDP 410 shares emergency data generated by a first ERE 441 with a second ERE 441 through the EDX, the ERDP 410 must first determine that the emergency data satisfies both a first set of EDX policies 444 established by the first ERE 441 and a second set of EDX policies 444 established by the second ERE 441. However, in some embodiments, before the ERDP 410 shares emergency data generated by a first ERE 441 with a second ERE 441 through the EDX, the ERDP 410 only needs to determine that the emergency data satisfies a set of EDX policies 444 established by the first ERE 441 (e.g., the ERE 441 that generated the emergency data). Similarly, in some embodiments, before the ERDP 410 shares emergency data generated by a first ERE 441 with a second ERE 441, the ERDP 410 only needs to determine that the emergency data satisfies a set of EDX policies 444 established by the second ERE 441 (e.g., the ERE 441 that will receive the emergency data).

Figure 5:
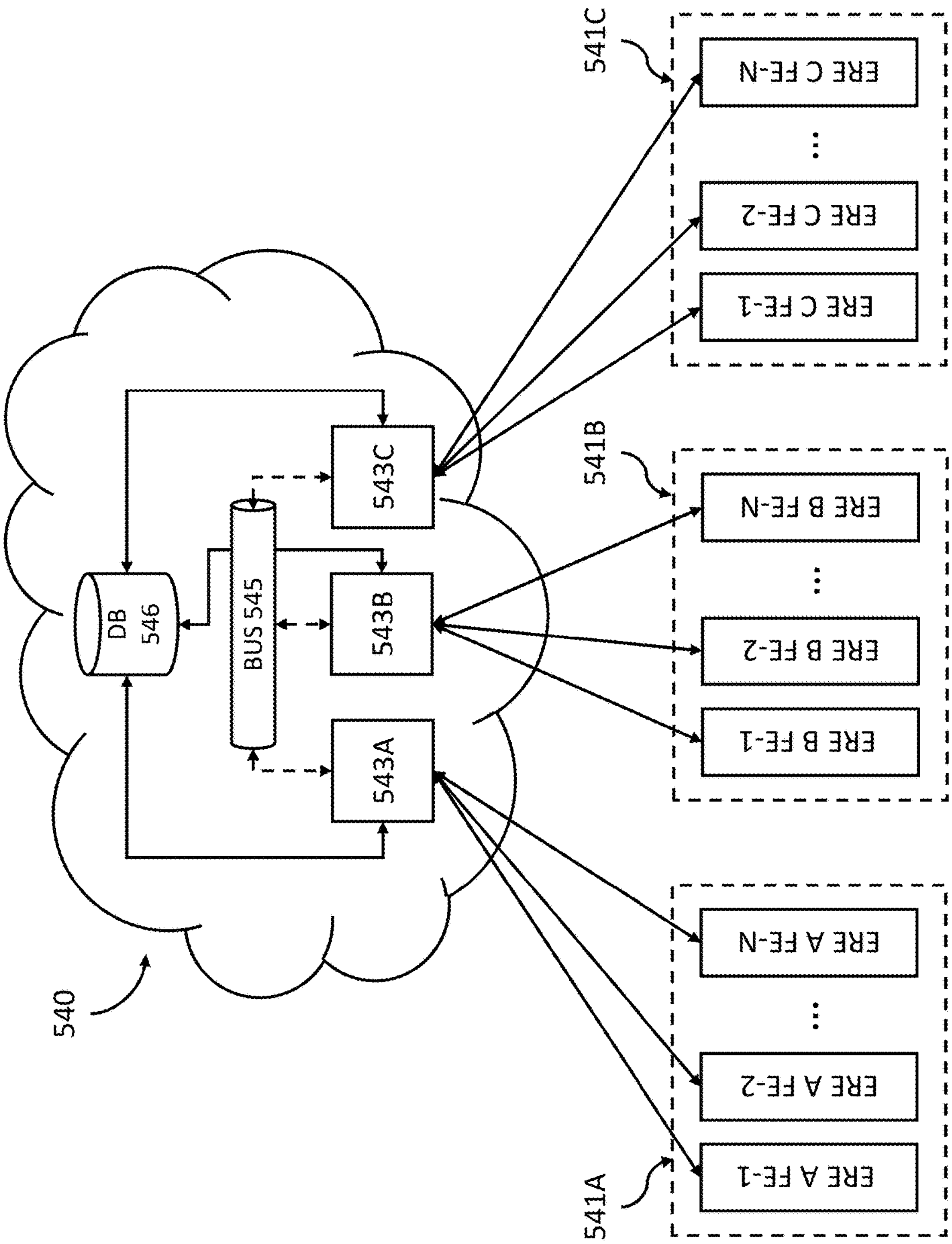
FIG. 5 depicts a diagram of an EDX communicatively coupled to a plurality of emergency response entities (EREs)

FIG. 5 depicts a diagram of an emergency data exchange (EDX), in accordance with some embodiments of the present disclosure. In the example depicted in FIG. 5, the EDX 540 is a cloud-based system and service provided and facilitated by an emergency response data platform (ERDP, as described above) communicatively coupled to three EREs 541A-541C. In some embodiments, as depicted in FIG. 5, when the ERDP establishes a communication link with an ERE 541, the ERDP establishes an individual communication link with one or more functional elements (FEs; e.g., software applications, software systems, hardware devices, hardware systems, or any combination thereof) associated with the ERE 541. An ERE 541 may be associated with a plurality of FEs. In some embodiments, an ERE 541 is associated with an FE if the FE is executed on a computing device associated with the ERE 541 (e.g., a computing device owned or operated by the ERE 541, or a computing device communicatively coupled to a communication network owned or operated by the ERE 541). For example, a call-handling system (also referred to as call-handling equipment (CHE) or customer premise equipment (CPE)), or a computer aided dispatch (CAD) system, or a record management system (RMS), or a mapping system, executed on a computing device associated with a PSAP, is a functional element associated with the PSAP. In the example depicted in FIG. 5, ERE 541A is associated with a first plurality of FEs (e.g., ERE A FE-1, ERE A FE-2, . . . , ERE A FE-N), ERE 541B is associated with a second plurality of FEs (e.g., ERE B FE-1, ERE B FE-2, . . . , ERE B FE-N), and ERE 541C is associated with a third plurality of FEs (e.g., ERE C FE-1, ERE C FE-2, . . . , ERE C FE-N). In the example depicted in FIG. 5, the ERDP has established individual communication links with each of the FEs associated with each of the EREs 541. However, the ERDP may establish an individual communication link with any or all of the FEs associated with an ERE 541. In some embodiments, the ERDP establishes a communication link with an FE through an application programming interface (API). In some embodiments, the communication link established between the ERDP and an FE is a websocket connection or a webhook connection. In some embodiments, much in the same way that the EDX 540 can facilitate communications between a first FE associated with a first ERE 541 and a second FE associated with a second ERE 541 (as described below), the EDX 540 can additionally or alternatively facilitate communications between a first FE and a second FE communicatively coupled to the EDX 540 and associated with the same ERE 541. For example, in the example depicted in FIG. 5, the EDX 540 can additionally or alternatively facilitate an exchange of emergency data between ERE A FE-1 and ERE A FE-2, or between ERE C FE-1 and ERE C FE-2. In some embodiments, an ERE 541 can establish EDX policies (as described below) that govern the exchange of emergency data through the EDX 540 between two or more FEs associated with the ERE 541 and communicatively coupled to the EDX 540.

In some embodiments, as depicted in FIG. 5, the EDX 540 includes one or more ERE account modules 543 and a message bus 545 communicatively coupled to the one or more ERE account modules 543. In some embodiments, an ERE account module 543 is a communicatively coupled assortment of software and/or hardware components (e.g., servers, processors, memories, software scripts, etc.) that function cooperatively to provide and facilitate a cloud-based ingress and egress interface between the EDX 540 and an ERE 541. In some embodiments, as depicted in FIG. 5, the EDX 540 includes an ERE account module 543 for each ERE 541 communicatively coupled to the EDX 540. For example, as depicted in FIG. 5, the EDX 540 is communicatively coupled to three EREs 541A-541C and includes three ERE account modules 543A-543C, respectively. In some embodiments, when the EDX 540 receives emergency data from an ERE 541 (e.g., from an FE associated with the ERE 541), the emergency data is received by the EDX 540 through an ERE account module 543 associated with the ERE 541. In some embodiments, emergency data received by the EDX 540 through an ERE account module 543 is received in the form of a single data object. In some embodiments, emergency data received by the EDX 540 through an ERE account module 543 is received in the form of an emergency incident data object (EIDO), as described above. In some embodiments, after the emergency data is received through the ERE account module 543, the ERE account module 543 publishes the emergency data to the message bus 545, where it can be received by any other ERE account module 543 associated with any other ERE 541. In some embodiments, an ERE account module 543 associated with an ERE 541 only receives emergency data published to the message bus 545 if the emergency data satisfies a set of EDX policies established by the ERE 541. In some embodiments, an ERE account module 543 associated with an ERE 541 only receives emergency data published to the message bus 545 if the emergency data satisfies a set of EDX policies established by the ERE 541 that generated the emergency data. In some embodiments, an ERE account module 543 associated with a first ERE 541 only receives emergency data published to the message bus 545 if the emergency data satisfies both a first set of EDX policies established by the first ERE 541 and a second set of EDX policies established by a second ERE 541 that generated the emergency data.

In some embodiments, as depicted in FIG. 5, the EDX 540 includes one or more ERE account modules 543, a message bus 545 communicatively coupled to the one or more ERE account modules 543, and a central database 546 communicatively coupled to the one or more ERE account modules 543. In some embodiments, after emergency data is received by the EDX 540 through an ERE account module 543, the ERE account module 543 transmits the emergency data to the central database 546, where the emergency data is stored for later retrieval. In some embodiments, emergency data submitted by an ERE account module 543 to the central database 546 is stored in the form of a single data object. In some embodiments, emergency data submitted by an ERE account module 543 to the central database 546 is stored in the form of an emergency incident data object (EIDO), as described above. In some embodiments, emergency data is stored within the central database 546 permanently. In some embodiments, emergency data is stored within the central database 546 temporarily (e.g., for one hour, for twenty-four hours, etc.). In some embodiments, emergency data is stored within the central database 546 for a period of time determined by an EDX policy established by the ERE 541 that generated the emergency data. In some embodiments, an ERE 541 may update emergency data stored within the central database 546 (e.g., an ERE account module 543 associated with the ERE 541 may transmit an update to the emergency data to the central database 546) if the emergency data satisfies a set of EDX policies established by the ERE 541. In some embodiments, an ERE 541 may update emergency data stored within the central database 546 if the emergency data satisfies a set of EDX policies established by the ERE 541 that originally generated the emergency data. In some embodiments, a first ERE 541 may update emergency data stored within the central database 546 if the emergency data satisfies both a first set of EDX policies established by the first ERE 541 and a second set of EDX policies established by a second ERE 541 that generated the emergency data. By maintaining a record of originally received emergency data and any updates to the emergency data, the central database 546 can serve as a source of truth for all emergency data received by the EDX 540, as described below. In some embodiments, after emergency data is received by the EDX 540 through an ERE account module 543, the ERE account module 543 transmits the emergency data to the central database 546 and publishes the emergency data to the message bus 545 (as described above and below) simultaneously.

Figure 6:
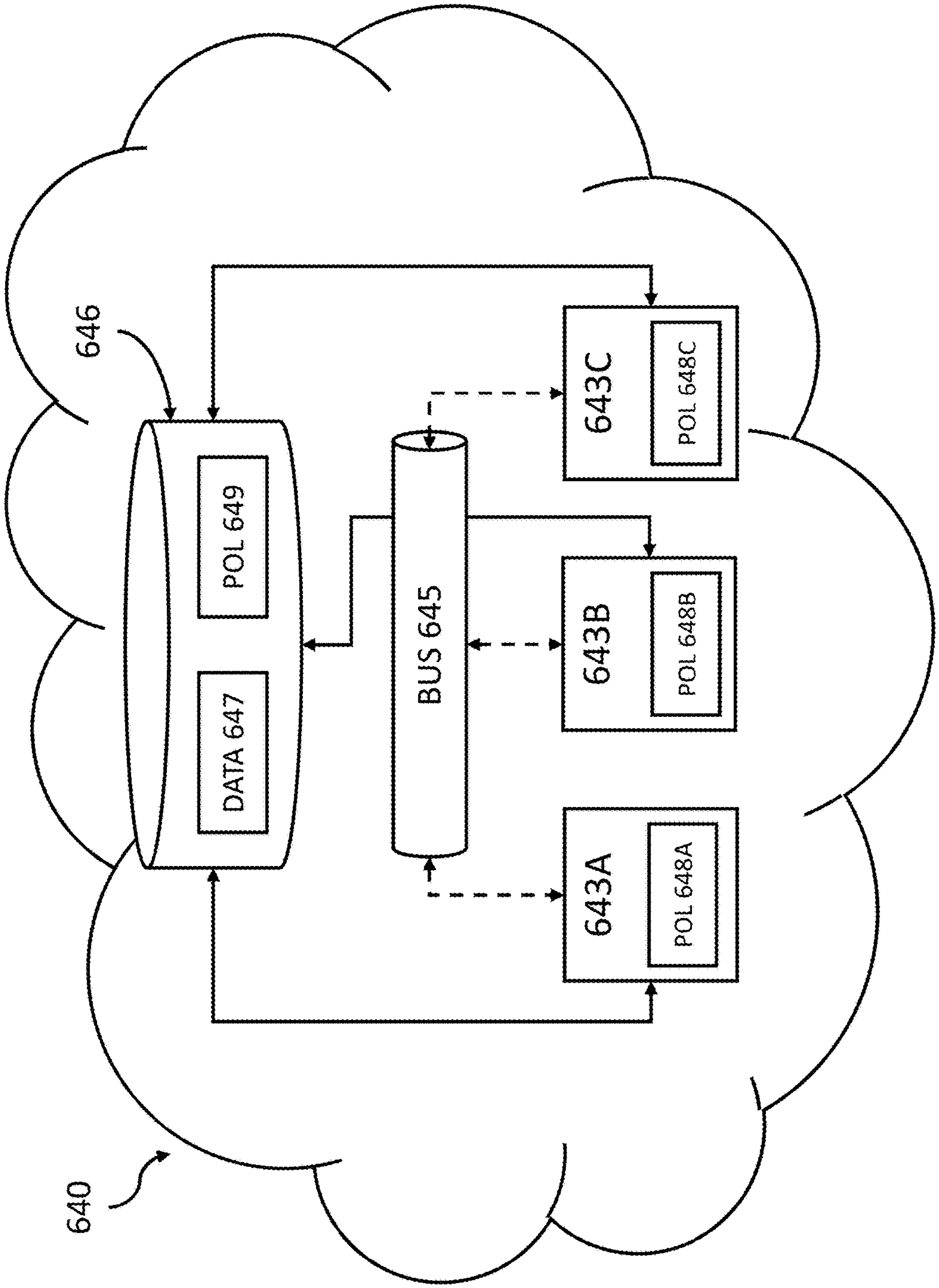
FIG. 6 depicts a diagram of an EDX.

FIG. 6 depicts a diagram of an emergency data exchange (EDX), in accordance with some embodiments of the present disclosure. In the example depicted in FIG. 6, the EDX 640 includes one or more ERE account modules 643 (as described above), a message bus 645 (as described above) communicatively coupled to the one more ERE account modules 643, and a central database 646 (as described above) communicatively coupled to the one or more ERE account modules 643 (as described above). In some embodiments, as depicted in FIG. 6, an ERE account module 643 includes an EDX policy store 648 that stores any and all EDX policies established by an ERE associated with the ERE account module 643. For example, as depicted in FIG. 6, ERE account module 643A includes an EDX policy store 648A that stores any and all EDX policies established by a first ERE associated with ERE account module 643A, ERE account module 643B includes an EDX policy store 648B that stores any and all EDX policies established by a second ERE associated with ERE account module 643B, and ERE account module 643C includes an EDX policy store 648C that stores any and all EDX policies established by a third ERE associated with ERE account module 643C. In some embodiments, an ERE account module 643 uses the EDX policies stored in its EDX policy store 648 to determine if the ERE account module 643 will receive emergency data published to the message bus 645, or if the ERE account module 643 will transmit emergency data that the ERE account module 643 accessed on the message bus 645 to an ERE associated with the ERE account module 643 (e.g., through an FE associated with the ERE, as described above).

For example, in the example depicted in FIG. 6, ERE account module 643A is associated with PSAP A (e.g., a first ERE). In this example, the EDX 640 is communicatively coupled to PSAP A through a first communication link established between the ERDP facilitating the EDX 640 and a computer aided dispatch (CAD) system (e.g., a first functional element) executed on a computing device associated with PSAP A. In this example, ERE account module 643B is associated with PSAP B (e.g., a second ERE). In this example, the EDX 640 is communicatively coupled to PSAP B through a second communication link established between the ERDP facilitating the EDX 640 and a CAD system (e.g., a second functional element) executed on a computing device associated with PSAP B. In this example, PSAP A (e.g., a member of PSAP A, such as a call-taker) has accessed a first instance of an ERE relationship management portal (as described below) from within the CAD system executed on the computing device associated with PSAP A, and, through the first instance of the ERE relationship management portal, PSAP A has submitted a request to establish an EDX link (as described above) with PSAP B. In response, the CAD system has transmitted the EDX link request to the EDX 640 through the first communication link, and the EDX 640 has transmitted the EDX link request to the CAD system executed on the computing device associated with PSAP B through the second communication link. PSAP B (e.g., a member of PSAP B, such as an administrator of PSAP B) has accessed a second instance of an ERE relationship management portal from within the CAD system executed on the computing device associated with PSAP B and accepted the EDX link request submitted by PSAP A. In response, the EDX 640 has established an EDX link between PSAP A and PSAP B. In this example, when the EDX link is established between PSAP A and PSAP B, at least two EDX policies are established (and associated with the EDX link) by default: 1) a first EDX policy stored within EDX policy store 648A that indicates that PSAP A consents to share emergency data with PSAP B; and 2) a second EDX policy stored within EDX policy store 648B that indicates that PSAP B consents to receive emergency data from PSAP A. Thus, in this example, when PSAP A transmits emergency data to the EDX 640 (e.g., when the CAD system executed on the computing device associated with PSAP A transmits emergency data to the ERDP, through the first communication link), ERE account module 643A knows, based on the first EDX policy stored within EDX policy store 648A, to publish the emergency data to the message bus 645 for PSAP B to receive. Similarly, when ERE account module 643A publishes the emergency data to the message bus 645, ERE account module 643B knows, based on the second EDX policy stored within EDX policy store 648B, to receive the emergency data and transmit the emergency data to PSAP B (e.g., to the CAD system executed on the computing device associated with PSAP B, through the second communication link). In this way, the emergency data submitted to the EDX 640 by PSAP A satisfies both the first EDX policy and the second EDX policy. In some embodiments, a functional element (e.g., the CAD system executed on the computing device associated with PSAP A) communicatively coupled to the EDX automatically submits emergency data to the EDX whenever new emergency data is generated by the functional element. In some embodiments, a functional element communicatively coupled to the EDX only submits emergency data to the EDX when a user of the functional element instructs the functional element to do so (e.g., by selecting an emergency data share button from within a graphical user interface of the functional element). In some embodiments, a functional element communicatively coupled to the EDX automatically submits emergency data to the EDX whenever new emergency data is generated by the functional element (e.g., to be stored in the central data store 646, as described below), but the ERE account module 643 through which the functional element submits emergency data to the EDX does not publish the emergency data to the message bus 645 unless a user of the functional element instructs the EDX to do so (e.g., by selecting an emergency data share button from within a graphical user interface of the functional element).

In another example, in the example depicted in FIG. 6, ERE account module 643C is associated with fire department A (e.g., a third ERE). In this example, the EDX 640 is communicatively coupled to fire department A through a third communication link established between the ERDP facilitating the EDX 640 and a fire dispatch software application (e.g., a third functional element) executed on a computing device associated with fire department A. In this example, PSAP A has again accessed the first instance of the ERE relationship management portal from within the CAD system executed on the computing device associated with PSAP A, and, through the first instance of the ERE relationship management portal, PSAP A has submitted a request to establish an EDX link with fire department A. In response, the CAD system has transmitted an EDX link request to the EDX 640 through the first communication link, and the EDX 640 has transmitted the EDX link request to the fire dispatch software application through the third communication link. Fire department A (e.g., a member of fire department A, such as a fire chief) has accessed a third instance of an ERE relationship management portal from within the first dispatch software application and accepted the EDX link request submitted by PSAP A. In response, the EDX 640 has established an EDX link between PSAP A and fire department A. In this example, like in the previous example, when the EDX link is established between PSAP A and fire department A, at least two EDX policies are established (and associated with the EDX link) by default: 1) a third EDX policy stored within EDX policy store 648A that indicates that PSAP A consents to share emergency data with fire department A; and 2) a fourth EDX policy stored within EDX policy store 648C that indicates that fire department A consents to receive emergency data from PSAP A. In this example, PSAP A accesses the first instance of the ERE relationship management portal and additionally establishes a custom fifth EDX policy stored within EDX policy store 648A that indicates that PSAP A consents to share only emergency data associated with fire emergencies with fire department A. Thus, in this example, when PSAP A transmits emergency data associated with a fire emergency to the EDX 640, and only when PSAP A transmits emergency data associated with a fire emergency to the EDX 640 (e.g., when the CAD system executed on the computing device associated with PSAP A transmits emergency data associated with a fire emergency to the ERDP, through the first communication link), ERE account module 643A knows, based on the third and fifth EDX policies stored within EDX policy store 648A, to publish the emergency data associated with the fire emergency to the message bus 645 for fire department A to receive. Similarly, when ERE account module 643A publishes the emergency data associated with the fire emergency to the message bus 645, ERE account module 643C knows, based on the fourth EDX policy stored within EDX policy store 648C, to receive the emergency data associated with the fire emergency and transmit the emergency data associated with the fire emergency to fire department A (e.g., to the fire dispatch software application executed on the computing device associated with fire department A, through the third communication link). In this way, the emergency data associated with the fire emergency submitted to the EDX 640 by PSAP A satisfies each of the third, fourth, and fifth EDX policies.

In some embodiments, as depicted in FIG. 6, the central database 646 includes a data store 647, in which emergency data received by the central database 646 is stored (as described above), and an aggregated EDX policy store 649, in which the central database 646 stores all of the EDX policies established by all of the EREs communicatively coupled to the EDX 640 (e.g., all of the EDX policies stored in the EDX policies stores 648). In some embodiments, the central database 646 uses the EDX policies stored in its aggregated EDX policy store 649 to determine if an ERE account module 643 is allowed to update emergency data stored within the central database 646 (e.g., emergency data stored within the data store 647). For example, in the example depicted in FIG. 6, PSAP A accesses the first instance of the ERE relationship management portal from within the CAD system executed on the computing device associated with PSAP A and edits, through the first instance of the ERE relationship management portal, the first EDX policy stored within the EDX policy store 648A to indicate that PSAP A consents to sharing emergency data with PSAP B and that PSAP A consents to allowing PSAP B to update emergency data generated by PSAP A. In this example, when PSAP A edits the first EDX policy stored in the EDX policy store 648A, ERE account module 643A transmits the edited first EDX policy to the central database 646, where the edited first EDX policy is stored within the aggregated EDX policy store 649. Later, PSAP A submits emergency data associated with a fire emergency to the EDX 640 (e.g., the CAD system executed on the computing device associated with PSAP A transmits emergency data associated with a fire emergency to the ERDP, through the first communication link). In this example, ERE account module 643A knows, based on the first, third, and fifth EDX policies, to publish the emergency data associated with the fire emergency to the message bus 645 for both PSAP B and fire department A to receive. Similarly, when ERE account module 643A publishes the emergency data associated with the fire emergency to the message bus 645, ERE account module 643B knows, based on the second EDX policy, to receive and transmit the emergency data associated with the fire emergency to PSAP B. Likewise, when ERE account module 643A publishes the emergency data associated with the fire emergency to the message bus 645, ERE account 643C knows, based on the fourth EDX policy, to receive and transmit the emergency data associated with the fire emergency to fire department A. In this example, if ERE account module 643B attempts to access and update the emergency data associated with the fire emergency stored within the central database 646, the central database 646 knows, based on the first and second EDX policies stored within the aggregated EDX policy store 649, to allow ERE account module 643B to access and update the emergency data associated with the fire emergency stored within the central database 646. However, in this example, if ERE account module 643C attempts to access and update the emergency data associated with the fire emergency stored within the central database 646, the central database 646 knows not to allow ERE account module 643C to access and update the emergency data associated with the fire emergency stored within the central database 646, because PSAP A, which generated the emergency data associated with the fire emergency, did not establish an EDX policy indicating that PSAP A consents to allowing fire department A to update emergency data generated by PSAP A.

For example, one day after the first, second, third, fourth, and fifth EDX policies in the examples above are established, a large building fire occurs within the jurisdiction of PSAP A. PSAP A creates a CAD incident for the building fire emergency within the CAD system executed on the computing device associated with PSAP A. The CAD incident created for the building fire emergency includes emergency data associated with the emergency, such as the location of the emergency, the type of the emergency (e.g., fire), the name and phone number of an emergency caller who called PSAP A regarding the emergency, and any comments or notes regarding the large building fire. After the CAD incident created for the building fire is created within the CAD system executed on the computing device associated with PSAP A, the CAD system transmits, through the first communication link, all of the emergency data included in the CAD incident to the EDX 640 in the form of a single emergency incident data object (EIDO). The EIDO is received by the EDX 640 through ERE account module 643A, and ERE account module 643A simultaneously transmits the EIDO to the central database 646 (e.g., to be stored within data store 647) and publishes the EIDO to the message bus 645 to be received by ERE account modules 643B and 643C, based on the first, second, third, fourth, and fifth EDX policies, stored in EDX policy stores 648A-648C. Based on the second EDX policy, stored within EDX policy store 648B, ERE account module 643B knows to receive the EIDO from the message bus 645 and transmit the EIDO, through the second communication link, to the CAD system executed on the computing device associated with PSAP B. Similarly, based on the fourth EDX policy, stored within EDX policy store 648C, ERE account module 643C knows to receive the EIDO from the message bus 645 and transmit the EIDO, through the third communication link, to the fire dispatch software application executed on the computing device associated with fire department A. In this way, the EDX 640 has automatically facilitated an exchange of emergency data between PSAP A, PSAP B, and fire department A, thereby providing improved interoperability between the three EREs.

In this example, PSAP A then assigns (e.g., dispatches), through the CAD system executed on the computing device associated with PSAP A, fire department A to the building fire emergency. In response, ERE account module 643A retrieves the most recently updated version of the EIDO from the central database 646 (e.g., by querying the central database 646—which knows to allow ERE account module 643A to access and update the EIDO, because the EIDO was originally generated by PSAP A—with an identifier associated with the EIDO, also referred to as an "EIDO ID"), updates the EIDO to include an indication that fire department A has been assigned to the building fire emergency, transmits the updated EIDO back to the central database 646 (e.g., to be stored within data store 647), and publishes the updated EIDO to the message bus 645 to be received by ERE account modules 643B and 643C, based on the first, second, third, fourth, and fifth EDX policies, stored in EDX policy stores 648A-648C. Again, based on the second EDX policy, stored within EDX policy store 648B, ERE account module 643B knows to receive the updated EIDO from the message bus 645 and transmit the updated EIDO, through the second communication link, to the CAD system executed on the computing device associated with PSAP B. Likewise, based on the fourth EDX policy, stored within EDX policy 648C, ERE account module 643C knows to receive the updated EIDO from the message bus 645 and transmit the updated EIDO, through the third communication link, to the fire dispatch software application executed on the computing device associated with fire department A. In this way, PSAP B and fire department A are automatically informed of PSAP A's decision to assign fire department A to the building fire emergency without any further action needing to be taken by PSAP A. In this example, PSAP B notices that the building fire is a large building fire, that the location of the building fire is very close to a border between the jurisdiction of PSAP A and the jurisdiction of PSAP B, and that fire department B, which is within the jurisdiction of PSAP B, is significantly closer to the location of the building fire than fire department A. Thus, PSAP B also assigns, through the CAD system executed on the computing device associated with PSAP B, fire department B to the building fire emergency. In response, ERE account module 643B retrieves the most recently updated version of the EIDO from the central database 646 (e.g., by querying the central database 646—which knows, based on the first and second EDX policies, to allow ERE module 643B to access and update the EIDO—with an EIDO ID associated with the EIDO), updates the EIDO to include an indication that fire department B has also been assigned to the building fire emergency, transmits the updated EIDO back to the central database 646 (e.g., to be stored within data store 647), and publishes the updated EIDO to the message bus 645 to be received by ERE account modules 643A (because the EIDO was originally generated by PSAP A) and 643C (based on the third, fourth, and fifth EDX policies). In this way, PSAP A and fire department A are automatically informed of PSAP B's decision to assign fire department B to the building fire emergency without any further action needing to be taken by PSAP B, and the response to the building fire emergency is made more effective and efficient. In this example, however, if ERE account module 643C attempts to access and update the EIDO, the central database 646 knows not to allow ERE account module 643C to access and update the EIDO, because PSAP A, which generated the EIDO, did not establish an EDX policy indicating that PSAP A consents to allowing fire department A to update emergency data generated by PSAP A.

In some embodiments, whenever emergency data is originally submitted to the EDX in the form of a data object (e.g., an EIDO), the data object is stored within the central database 646 (e.g., within the data store 647, as described above). In some embodiments, when the data object is received and stored by the central database 646, the central database 646 authenticates and verifies the data object as the most recently updated version of the data object (e.g., by applying a digital signature to the data object). In this way, by digitally verifying the most recently updated version of the data object, the central database 646 serves as a source of truth for the data object. In such an embodiment, if any ERE that has permission to access or update the data object (based one or more sets of EDX policies, as described above) attempts to do so, the ERE (e.g., an ERE account module associated with the ERE) must first retrieve the entire, digitally verified, most recently updated version of the data object from the central database 646 before making updates to the data object and transmitting the updated data object back to the central database 646 (or publishing the updated data object back to the message bus 645). When the updated data object is received and stored by the central database 646, the central database 646 again authenticates and verifies the updated data object (e.g., by again applying a digital signature to the data object, which may be a new digital signature, for further authentication and verification). In such an embodiment, this digital verification process continues with each retrieval and update to the data object, so that the data object cannot be erroneously shared or manipulated. For example, by forcing an ERE to retrieve an entire, digitally verified, most recently updated version of a data object before updating the data object and transmitting the data object back to the central database 646 (or publishing the data back to the message bus 645), the EDX ensures that the ERE receives a fully accurate version of the data object, and that each other ERE communicatively coupled to the EDX receives a fully accurate version of the data object as well. In some embodiments, when the EDX stores a data object within the central database 646, the EDX includes with, or appends to, the data object a record of actions regarding or taken on the data object (e.g., which ERE originally generated the data object, and when; which ERE(s) have since retrieved or updated the data object, and when; and what updates those ERE(s) made to the data object, if any).

ERE Relationship Management Portal

Figure 7A:
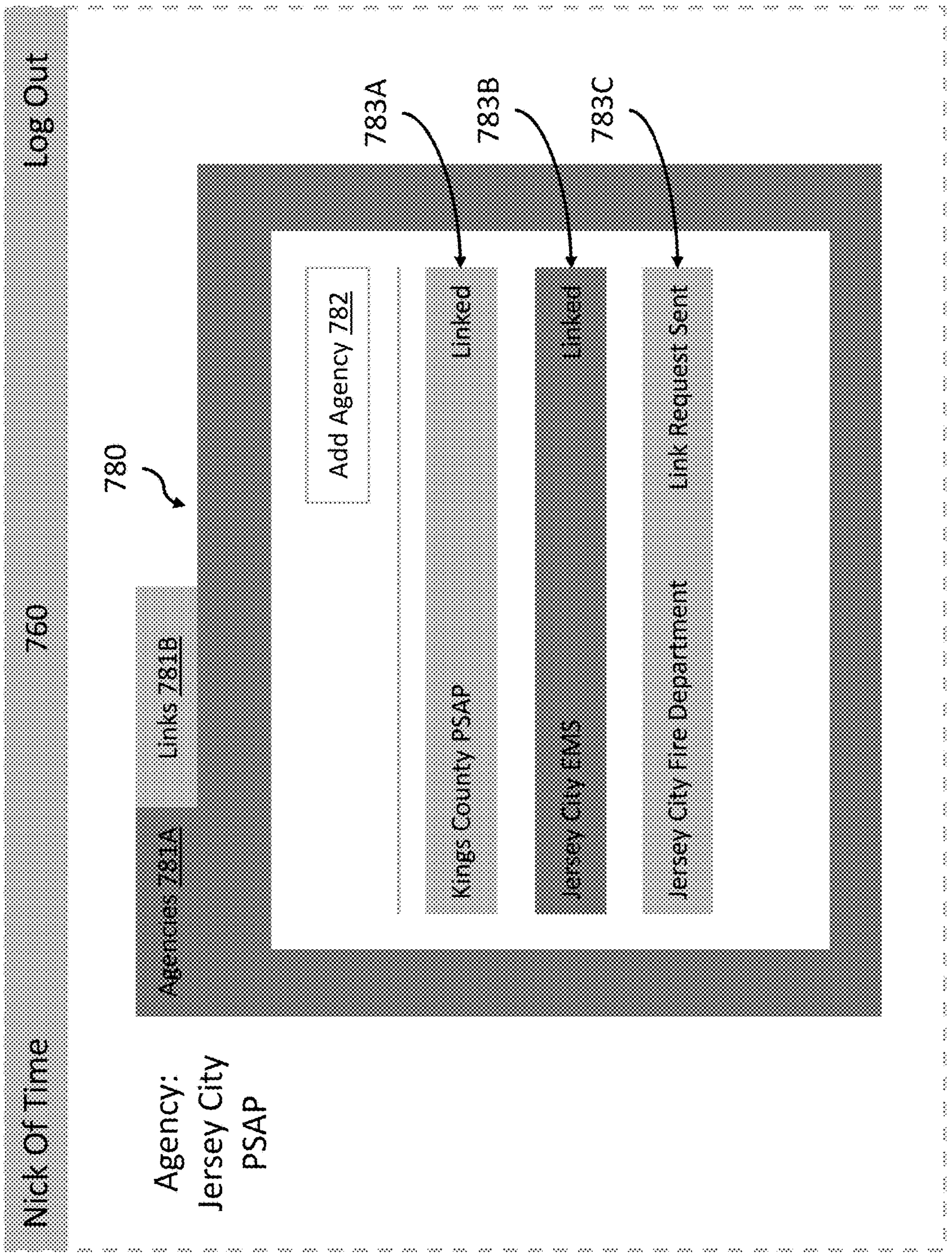
FIG. 7A and FIG. 7B provide an illustrative example of an ERE relationship management portal.
Figure 7B:
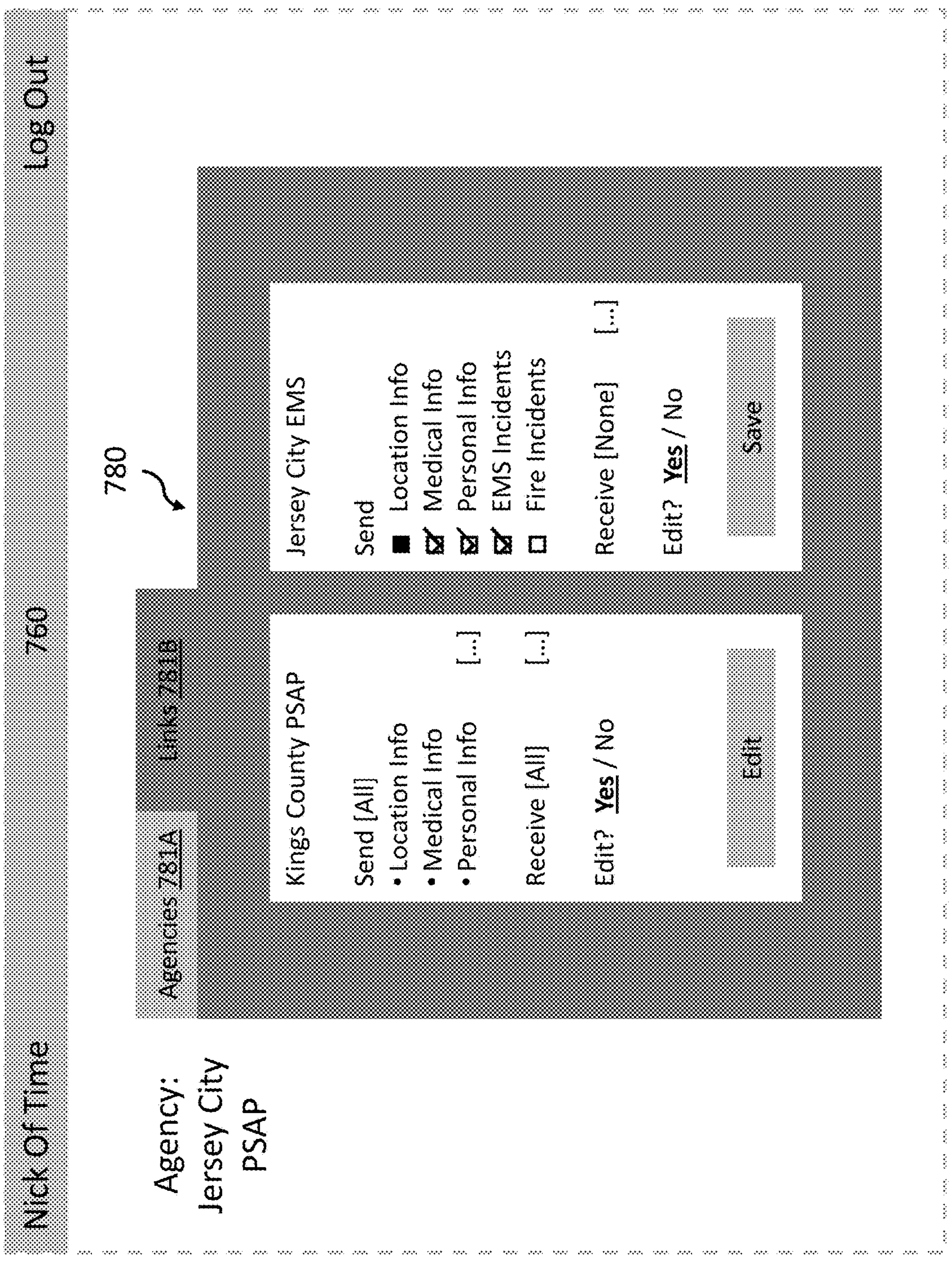

FIGS. 7A and 7B illustrate a first instance of an ERE relationship management portal, in accordance with some embodiments of the present disclosure. As illustrated in FIG. 7A, the ERE relationship management portal 780 (which may be a component of an emergency response application 760, as described above, or a component of a functional element, as described above) can be used by an ERE to establish a set of EDX policies (as described above; also referred to as "emergency data sharing criteria"), as mentioned above. In the example illustrated in FIG. 7A, the ERE accessing the ERE relationship management portal is the Jersey City PSAP. In this example, the ERE relationship management portal has two tabs, an Agencies tab 781A and a Links tab 781B. In some embodiments, an ERE can use the Agencies tab 781A to establish an EDX link (as mentioned above) with another ERE. For example, in the example illustrated in FIG. 7A, the Jersey City PSAP has established EDX links with three other EREs: Kings County PSAP, Jersey City EMS, and Jersey City Fire Department. In some embodiments, when a first ERE requests to establish an EDX link with a second ERE (e.g., by selecting the Add Agency button 782), an EDX link request (as mentioned above) is sent to the second ERE (e.g., the EDX link request is sent to the second ERE by the ERDP through the ERE relationship management portal 780), and the EDX link request must be accepted by the second ERE before the EDX link between the first ERE and the second ERE is established. In some embodiments, the ERE relationship management portal 780 displays an EDX link status 783 between the ERE accessing the ERE relationship management portal 780 and other EREs. For example, in the example illustrated in FIG. 7A, the EDX link status 783B between the Jersey City PSAP and the Jersey City EMS is "Linked," while the EDX link status 783C between the Jersey City PSAP and the Jersey City Fire Department is "Link Request Sent."

In some embodiments, an ERE can use the Links tab 781B to manage the EDX links that the ERE has established with other EREs (e.g., the ERE can terminate the EDX links, or add, remove, or edit EDX policies associated with the EDX links, as mentioned above). For example, in the example illustrated in FIG. 7B, the Links tab 781B of the ERE relationship management portal 780 displays the EDX links established between the Jersey City PSAP and both the Kings County PSAP and Jersey City EMS. As illustrated in FIG. 7B, using the Links tab 781B, the ERE can specify for another ERE which types of emergency data that the ERE consents to share, from which data sources the ERE consents to share emergency data, and for which emergency types the ERE consents to share emergency data. Likewise, in some embodiments, using the Links tab 781B, the ERE can specify for another ERE which types of emergency data the ERE consents to receive, from which data sources the ERE consents to receive emergency data, and for which emergency types the ERE consents to receive emergency data. For example, in the example illustrated in FIG. 7B, the Jersey City PSAP has specified that, for the Kings County PSAP, the Jersey City PSAP consents to share and receive all available emergency data. However, the Jersey City PSAP has also specified that, for the Jersey City EMS, the Jersey City PSAP consents to share location information, medical information, and personal information for EMS incidents (e.g., medical emergencies), but not for fire incidents (e.g., fire emergencies), and consents to receive no emergency data from the Jersey City EMS. In some embodiments, an ERE only specifies what the ERE consents to share or what the ERE consents to receive, but not both. In some embodiments, as illustrated in FIG. 7B, using the Links tab 781B, an ERE can specify whether or not another ERE can edit (e.g., update, as described above) emergency data generated by the ERE. For example, in the example illustrated in FIG. 7B, the Jersey City PSAP has consented to allowing both the Kings County PSAP and the Jersey City EMS to edit emergency data generated by the Jersey City PSAP. In some embodiments, every specification made to an EDX link by an ERE creates and associates an EDX policy (as described above) to the EDX link that represents the specification.

Figure 8A:
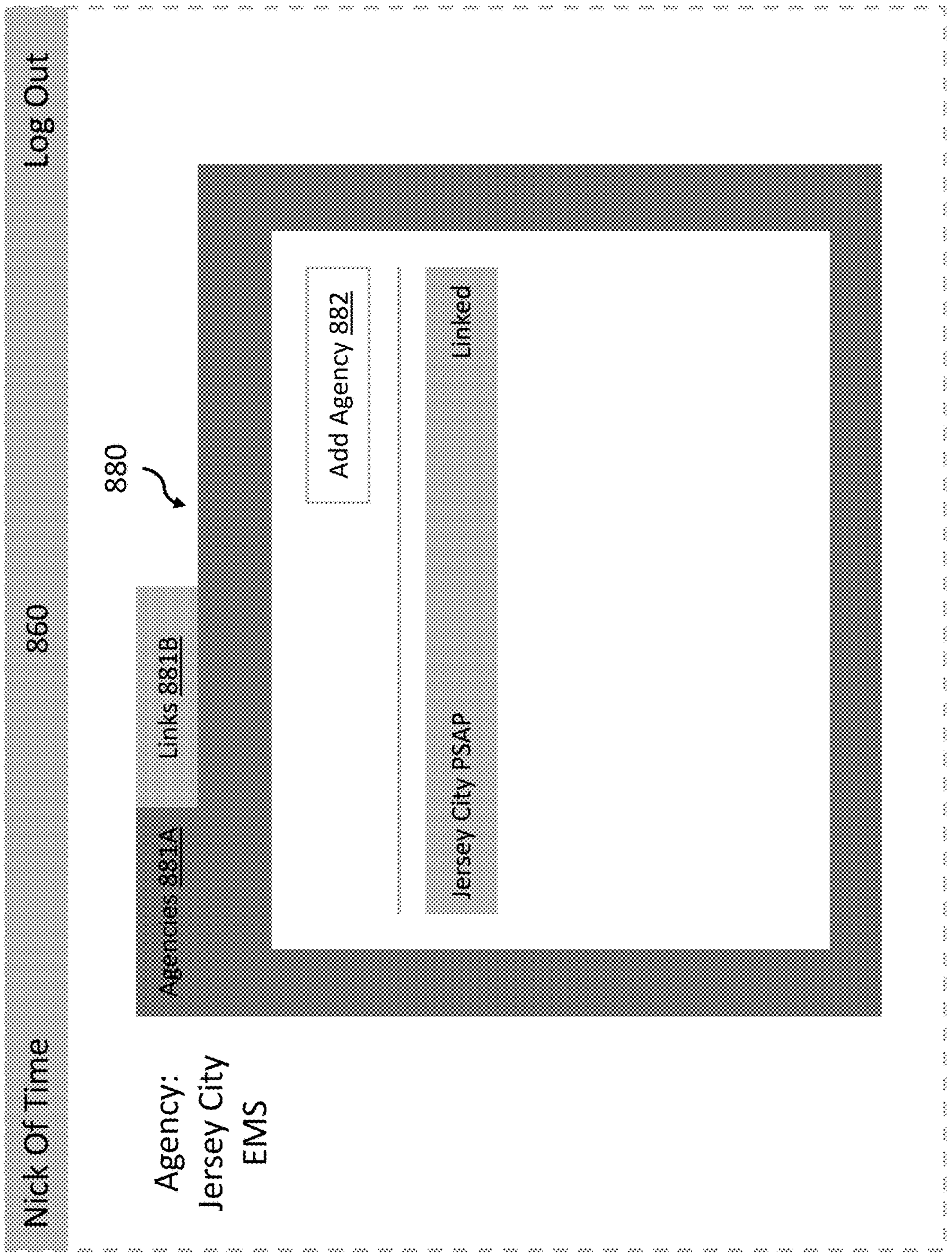
FIG. 8A and FIG. 8B provide an illustrative example of an ERE relationship management portal.
Figure 8B:
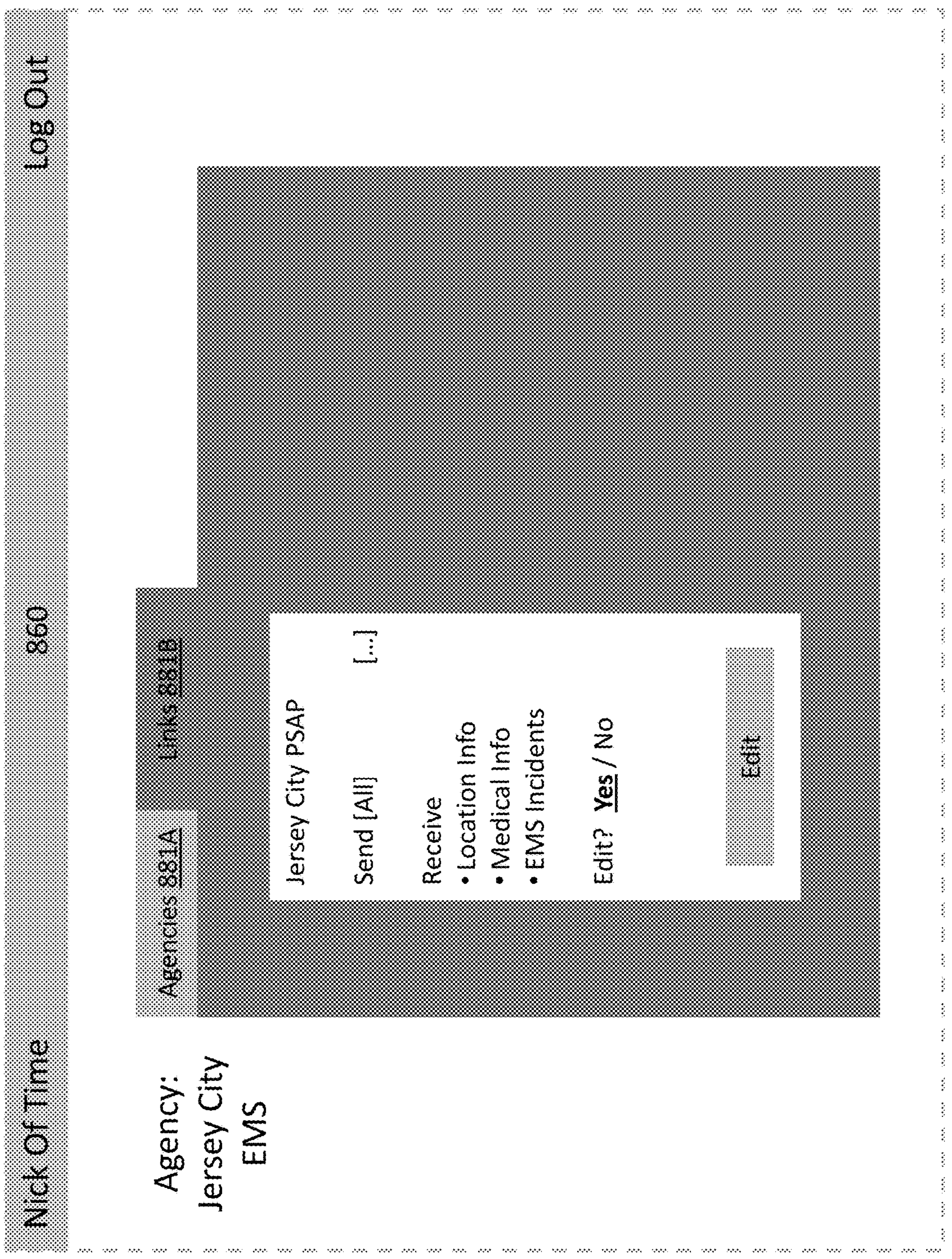

FIGS. 8A and 8B illustrate a second instance of an ERE relationship management portal, in accordance with some embodiments of the present disclosure. In the example illustrated in FIGS. 8A and 8B, the ERE accessing the ERE relationship management portal 880 is the Jersey City EMS, with whom the Jersey City PSAP previously established an EDX link (as described above with respect to FIGS. 7A and 7B). In the example illustrated in FIG. 8A, the Agencies tab 881A displays the EDX link established between the Jersey City EMS and the Jersey City PSAP, which, in this example, is the only link that the Jersey City EMS has established through the ERE relationship management portal 880. Likewise, as illustrated in FIG. 8B, the Jersey City EMS can use the Links tab 881B to manage their EDX link with the Jersey City PSAP. In this example, as illustrated in FIG. 8B, the Jersey City EMS has specified that it consents to share all emergency data with the Jersey City PSAP but only consents to receive location information and medical information for EMS incidents from the Jersey City PSAP. In some embodiments, once an EDX link has been established between to EREs (e.g., through the ERE relationship management portal, as described above), the ERDP can facilitate the exchange of emergency data from one of the EREs to the other (e.g., through the EDX, as described above). However, in some embodiments, an EDX link does not need to be established between two EREs before emergency data can be exchanged between the two EREs. For example, in some embodiments, if an ERE communicatively coupled to the EDX would only like to share emergency data associated with a particular incident to another ERE communicatively coupled to the EDX in a one-time fashion, the ERE can select (e.g., through a functional element communicatively coupled to the EDX and associated with the ERE, as described above) to share the emergency data with the other ERE, and the other ERE can consent to receive (e.g., through a functional element communicatively coupled to the EDX and associated with the other ERE, as described above) the emergency data from the ERE that one time, without the two EREs first establishing an EDX link between them.

Figure 9:
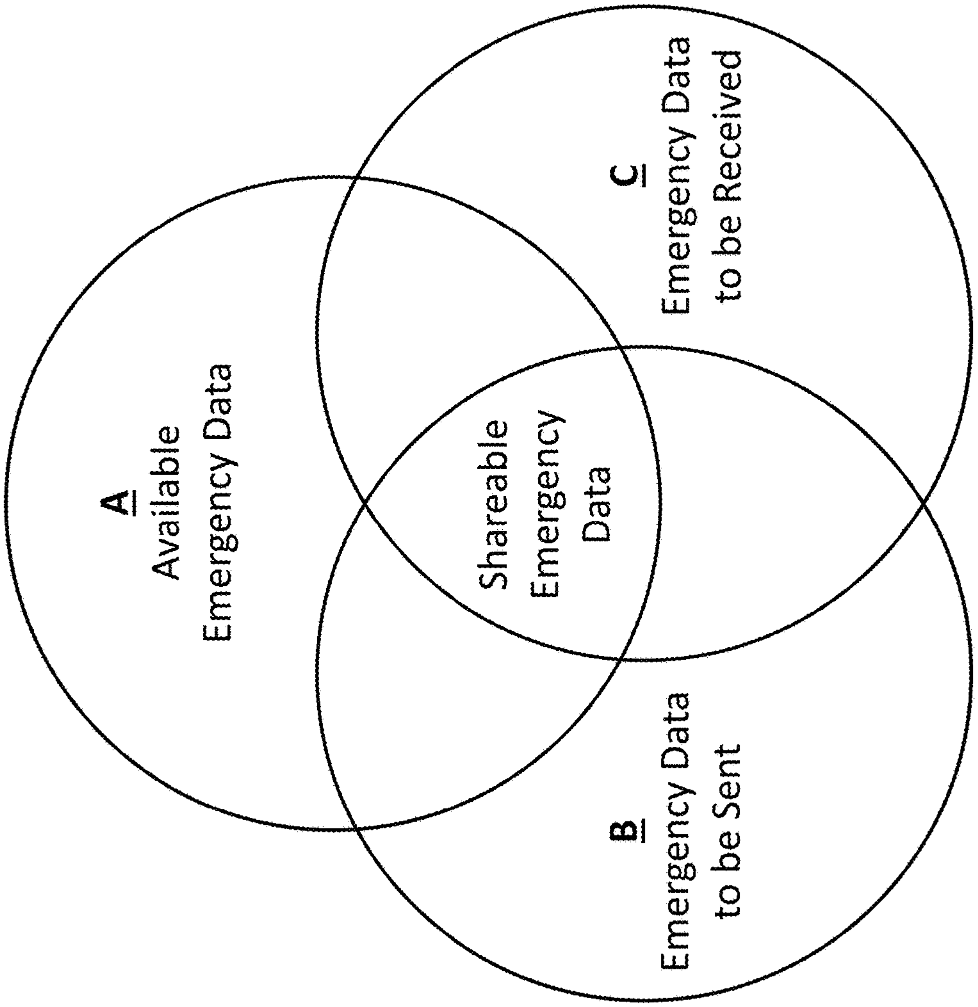
FIG. 9 depicts a process for using emergency data sharing criteria to manage the transmission of emergency data from one ERE to another.

As mentioned above, in some embodiments, the ERDP uses EDX policies (also referred to as "emergency data sharing criteria") established by EREs when transmitting emergency data from one ERE to another. FIG. 9 depicts a process for using EDX policies to manage the transmission of emergency data from one ERE to another. For example, in some embodiments, as described above, when a functional element (e.g., a computer aided dispatch system) associated with a first ERE and communicatively coupled to the EDX generates an emergency incident data object (EIDO), the functional element automatically transmits the EDIO to the EDX (e.g., through an ERE account module associated with the ERE, as described above). When the EDX receives the EIDO, the EDX can automatically share the EDIO with a second ERE (e.g., via a message bus communicatively coupled to ERE account modules associated with both EREs, as described above) if B) a first set of EDX policies established by the first ERE indicates that the first ERE consents to share the EIDO with the second ERE; and C) a second set of EDX policies established by the second ERE indicates that the second ERE consents to receive the EIDO from the first ERE. In such a case, the EDX would determine that the EIDO satisfies both the first and second sets of EDX policies and automatically transmit the EIDO to the second ERE (e.g., through an ERE account module communicatively coupled to a functional element associated with the second ERE). Or for example, in some embodiments, as described below, an ERE can manually select an emergency incident (e.g., from within an emergency response application or a computer aided dispatch system) for which they would like share emergency data associated with, and then manually select another ERE (e.g., another ERE with whom the ERE has established an EDX link through an ERE relationship management portal, as described above) that they would like to share the emergency data associated with the emergency incident with. In response, the ERDP gathers A) any/all emergency data associated with the emergency incident; B) a first set of EDX policies, which specifies what emergency data that the first ERE (e.g., the sending ERE) consents to share with the second ERE (e.g., the receiving ERE); and C) a second set of EDX policies, which specifies what emergency data that the second ERE consents to receive form the first ERE. The ERDP can then determine what portion of the available emergency data associated with the emergency incident satisfies both the first and second sets of EDX policies and transmits that portion of the available emergency data to the second ERE.

For example, in the case of the Jersey City PSAP and the Jersey City EMS from the examples illustrated in FIGS. 7A, 7B, 8A, and 8B, the Jersey City PSAP has specified in a first set of EDX policies associated with the EDX link between the Jersey City PSAP and the Jersey City EMS that the Jersey City PSAP consent to share location information, medical information, and personal information for EMS incidents to the Jersey City EMS, and the Jersey City EMS has specified in a second set of EDX policies associated with the EDX link between the Jersey City PSAP and the Jersey City EMS that the Jersey City EMS consents to receive location information and medical information for EMS incidents from the Jersey City PSAP. In this example, the Jersey City PSAP receives location information, medical information, and personal information for an EMS type emergency incident and chooses to send emergency data associated with the emergency incident to the Jersey City EMS through the EDX. In response, the ERDP gathers any and all available emergency data associated with the emergency incident (which, in this case, includes location information, medical information, personal information, and an indication that the emergency type is EMS), and then retrieves the first set of EDX policies associated with the EDX link between the Jersey City PSAP and the Jersey City EMS. In this example, the ERDP then determines that all of the emergency data associated with the emergency incident satisfies the first set of EDX policies. However, the ERDP then retrieves the second set of EDX policies associated with the EDX link between the Jersey City PSAP and the Jersey City EMS and determines that only the emergency type, the location information, and the medical information satisfies the second set of EDX policies. Thus, in this example, the ERDP transmits only the location information, medical information, and emergency type to the Jersey City EMS.

EDX and Emergency Response Application

Figure 10:
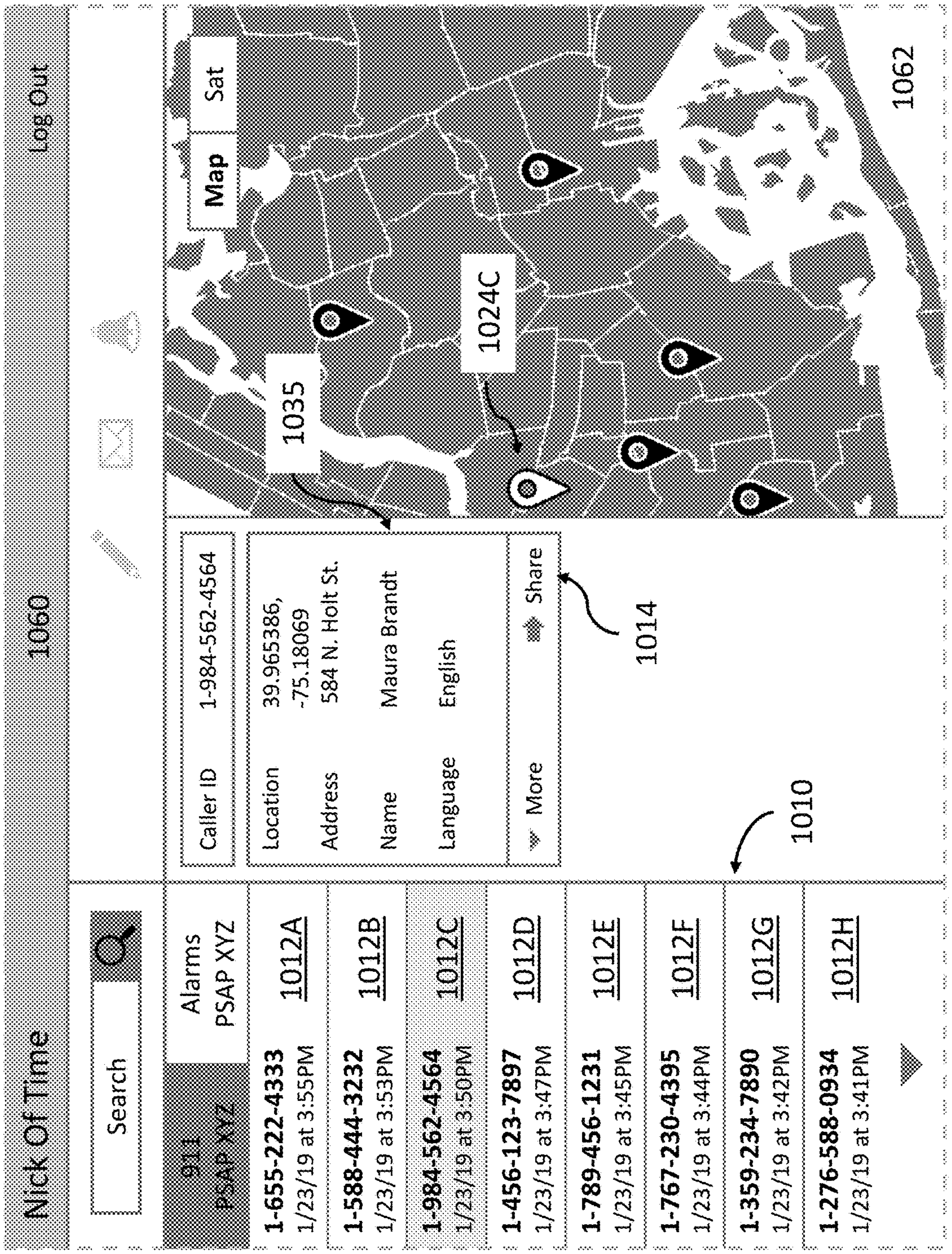
FIG. 10 provides an illustrative example of a first instance of an emergency response application provided by the ERDP to an ERE.
Figure 11:
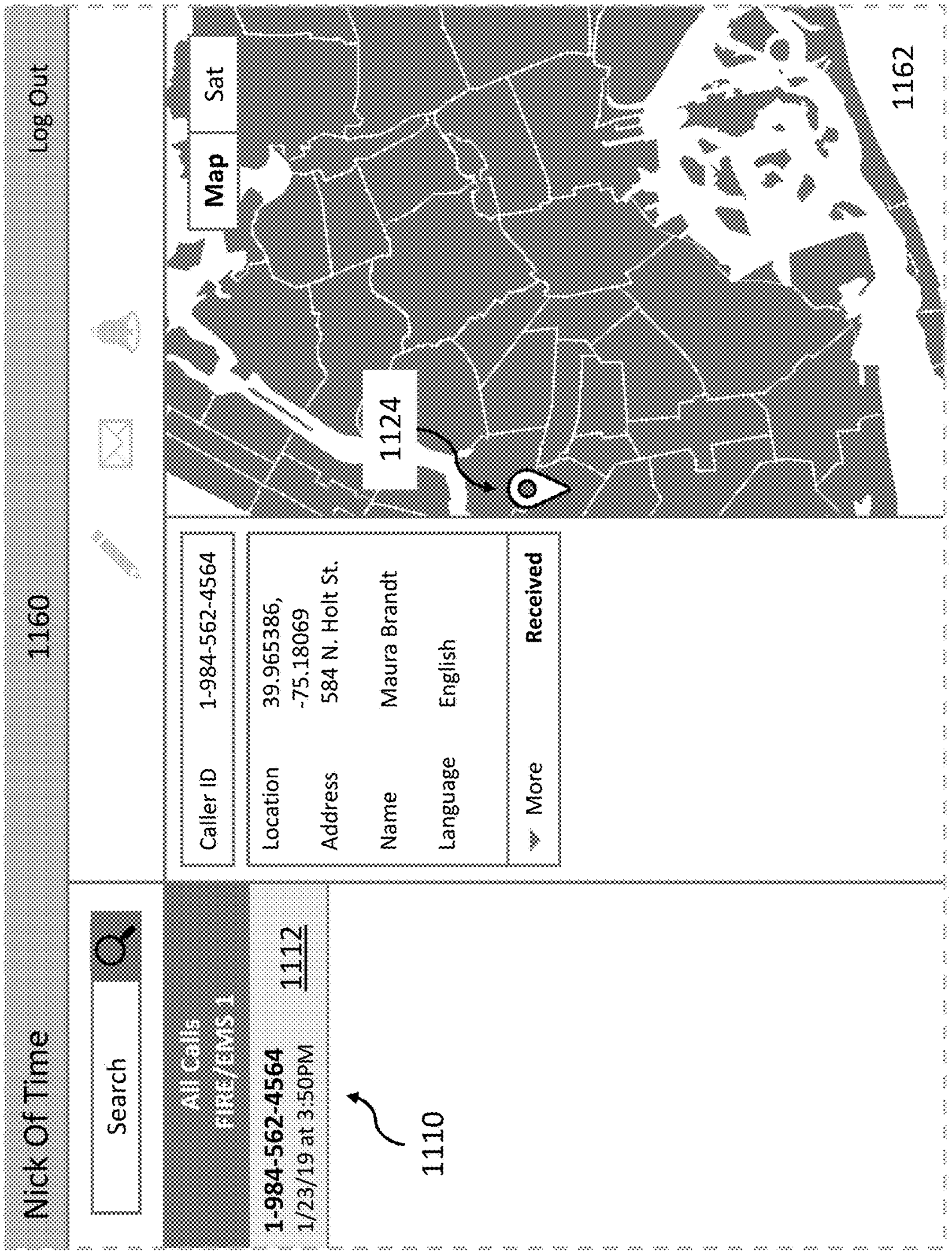
FIG. 11 shows an illustrative example of a second instance of an emergency response application provided by the ERDP to an ERE.

In some embodiments, as described above, the ERDP provides an emergency response application to an ERE (such as a PSAP) through which the ERDP can provide the ERE with emergency data. FIG. 10 illustrates a first instance of an emergency response application provided by the ERDP to an ERE, in accordance with some embodiments of the present disclosure. In some embodiments, as mentioned above, a first ERE can select an emergency incident 1012 (e.g., from a list of emergency incidents 1010) and a second ERE to whom the first ERE would like to send emergency data associated with the emergency incident to through a graphical user interface (GUI) of the emergency response application 1060, such as by selecting a Share button 1014 (as illustrated in FIG. 10). In some embodiments, the ERDP transmits the emergency data associated with the emergency incident (e.g., a portion of the emergency data associated with the emergency incident that satisfies both a first set of EDX policies established the first ERE and a second set of EDX policies established by the second ERE, as described above) to the second ERE through a second instance of the emergency response application provided by the ERDP to the second ERE. For example, in the example illustrated in FIG. 10, a user of a first instance of the emergency response application 1060 (e.g., a member of PSAP XYZ) has selected emergency incident 1012C from the list of emergency incidents 1010. The emergency response application 1060 now displays emergency data 1035 (e.g., within an emergency data card) associated with emergency incident 1012C, including an emergency location associated with emergency incident 1012C, a name of the emergency caller associated with emergency incident 1012C, the native language of the emergency caller associated with emergency incident 1012C. The emergency response application 1060 also displays the emergency location associated with emergency incident 1012C as an incident location 1024C within an interactive map 1062. In this example, the user of the emergency response application 1060 selects the Share button 1014 and selects to share the emergency data 1035 associated with emergency incident 1012C with FIRE/EMS 1. In this example, the ERDP has determined that the emergency data 1035 associated with emergency incident 1012C satisfies both a first set of EDX policies established by PSAP XYZ and a second set of EDX policies established by FIRE/EMS 1 (e.g., a first and second set of EDX policies associated with an EDX link established between PSAP XYZ and FIRE/EMS 1, as described above) and, in response, transmitted the emergency data 1035 associated with emergency incident 1012C to FIRE/EMS 1 through a second instance of the emergency response application 1160 provided by the ERDP to FIRE/EMS 1, as illustrated in FIG. 11. As illustrated in FIG. 11, the second instance of the emergency response application 1160 now displays the emergency incident 1012C as emergency incident 1112 within the list of emergency incidents 1110, the emergency data 1135 associated with emergency incident 1112, and the emergency location associated with emergency incident 1112 as a location incident 1124 within the interactive map 1162.

In some embodiments, the ERDP can autonomously share emergency data associated with an emergency incident between a first and second ERE if the first and second EREs have previously established an EDX link between them (as described above). For example, referring back to the Jersey City PSAP and the Jersey City EMS described above with respect to FIGS. 7A, 7B, 8A, and 8B, if the Jersey City PSAP receives emergency data associated with an emergency incident that satisfies both a first set of EDX policies established by the Jersey City PSAP and a second set of EDX policies established by the Jersey City EMS (as described above), the EDX can autonomously transmit the emergency data associated with the emergency incident (or an appropriate portion of the emergency data, as described above) to the Jersey City EMS, without requiring any manual selection(s) from the Jersey City PSAP. Furthermore, if the emergency data associated with the emergency incident that the Jersey City EMS receives satisfies both a third set of EDX policies established by the established by the Jersey City EMS regarding a third ERE (e.g., a hospital) and a fourth set of EDX policies established by the third ERE regarding the Jersey City EMS, the EDX can autonomously transmit the emergency data associated with the emergency incident (or an appropriate portion of the emergency data) to the third ERE. In this way, emergency data associated with an emergency incident may be quickly, autonomously, and appropriately shared between EREs that may have an interest in the emergency incident.

Figure 12:
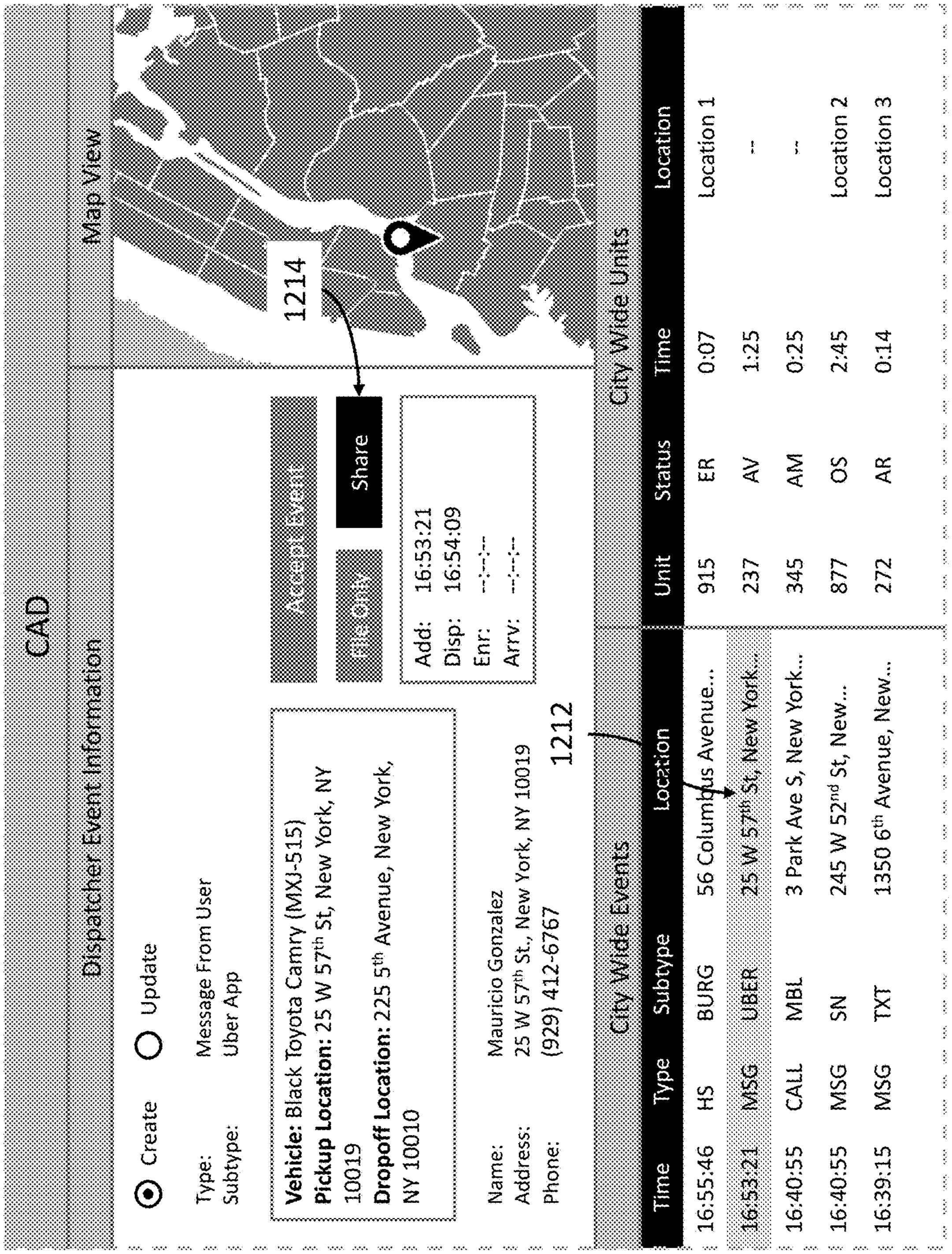
FIG. 12 shows an illustrative example of a computer aided dispatch (CAD) program interface that can take part in an emergency data exchange as disclosed herein.

In some embodiments, as mentioned above, the EDX maintains a record of actions regarding or taken on emergency data submitted to the EDX. Similarly, in some embodiments, the EDX generates and maintains an incident record for an emergency incident that records transmission details associated with the emergency incident, such as which ERE(s) received emergency data associated with the emergency incident and what emergency data those EREs received, which ERE(s) selected to share emergency data associated with the emergency incident and to whom, any updated emergency data associated with the emergency incident and which ERE(s) generated or submitted the updated emergency data, and any additional emergency data associated with the emergency incident and which ERE(s) generated or submitted the additional emergency data. However, the incident record may record any other details associated with the emergency incident. In some embodiments, actions taken by an ERE on an emergency incident (e.g., sharing emergency data associated with the emergency incident, updating emergency data associated with the emergency incident, adding additional emergency data associated with the emergency incident, etc.) are given a digital signature associated with the ERE that took the action within the incident record by the ERDP. In some embodiments, any and all emergency data associated with an emergency incident submitted to the EDX is received and stored by the EDX in the form of an emergency incident data object (EIDO), as described above. In some embodiments, the ERDP receives emergency data associated with an emergency incident and/or a request to transmit emergency data associated with the emergency incident from an ERE through an application or program that is not provided by the ERDP (e.g., a functional element, as described above), such as the computer aided dispatch (CAD) system illustrated in FIG. 12. In some embodiments, the ERDP transmits emergency data (e.g., emergency data associated with an emergency incident) to an ERE through a CAD program or system associated with the ERE. In some embodiments, when the ERDP transmits emergency data to an ERE through a CAD system, a new incident 1212 is generated for the emergency data within the CAD system. In some embodiments, an ERE can instruct a CAD system associated with the ERE to transmit emergency data associated with an emergency incident 1212 by selecting the emergency incident 1212 from within a graphical user interface (GUI) of the CAD system and then selecting a Share button 1214. In some embodiments, when a CAD system associated with an ERE is communicatively coupled to the EDX, the CAD system can automatically transmit emergency data associated with an emergency incident 1212 to the EDX as soon as the emergency data associated with the emergency incident 1212 is generated. In some embodiments, any and all emergency data associated with an emergency incident 1212 submitted to the EDX by a CAD system is received and stored by the EDX in the form of an EIDO.

What is claimed:

1. A method of operating an emergency data exchange module of a cloud-based emergency response data platform, the method comprising:

establishing, with the emergency data exchange module, a first communication link with a first software application executed on a first computing device at a first emergency response entity and a second communication link with a second software application executed on a second computing device at a second emergency response entity;

determining, by the emergency data exchange module via a first policy store associated with the first emergency response entity, and via a second policy store associated with the second emergency response entity, a first set of emergency data sharing criteria regarding the second emergency response entity and a second set of emergency data sharing criteria regarding the first emergency response entity, both the first policy store and the second policy store operatively coupled to the emergency data exchange module;

receiving, by the emergency data exchange module, emergency data from the first software application at the first emergency response entity via the first communication link;

determining, by the emergency data exchange module, that the emergency data satisfies both the first and second sets of emergency data sharing criteria; and transmitting the emergency data to the second software application at the second emergency response entity, from the emergency data exchange module via the second communication link, in response to determining that the emergency data satisfies both the first set of emergency data sharing criteria from the first policy store, and the second set of emergency data sharing criteria from the second policy store.

2. The method of claim 1, wherein receiving, by the emergency data exchange module, emergency data from the first software application at the first emergency response entity via the first communication link, comprises:

receiving the emergency data in the form of a single data object.

3. The method of claim 1, further comprising:

storing the emergency data in the form of a single data object.

4. The method of claim 3, further comprising:

storing the single data object as an emergency incident data object (EIDO).

5. The method of claim 3, further comprising:

receiving updated emergency data from the second software application via the second communication link;

updating the single data object using the updated emergency data; and transmitting the updated emergency data to the first software application via the first communication link.

6. The method of claim 5, further comprising:

digitally verifying that the single data object stored is up to date and is a most recent version; and transmitting the updated emergency data to the first software application to update the single data object in response to digitally verifying that the single data object is the most recent version.

7. The method of claim 3, further comprising:

enforcing, by the emergency data exchange module, the first set or emergency data sharing criteria regarding the second emergency response entity, by permitting the second emergency response entity to read from the single data object, and preventing the second emergency response entity to write to the single data object.

8. The method of claim 3, further comprising:

enforcing, by the emergency data exchange module, the first set of emergency data sharing criteria regarding the second emergency response entity, by permitting the second emergency response entity to read from the single data object and write to the single data object.

9. The method of claim 1, wherein determining the first set of emergency data sharing criteria regarding the second emergency response entity comprises:

determining that the second emergency response entity is permitted to write to a data object.

10. The method of claim 1, further comprising:

determining at least a portion of the first set of emergency data sharing criteria and at least a portion of the second set of emergency data sharing criteria, through an emergency response entity relationship management portal accessed by the first emergency response entity and the second emergency response entity.

11. The method of claim 10, further comprising:

receiving at least a portion of the first set of emergency data sharing criteria regarding the second emergency response entity from the first emergency response entity through the emergency response entity relationship management portal; and receiving at least a portion of the second set of emergency data sharing criteria regarding the first emergency response entity from the second emergency response entity through the emergency response entity relationship management portal.

12. The method of claim 10, further comprising:

establishing an emergency response entity link between the first emergency response entity and the second emergency response entity through the emergency response entity relationship management portal, wherein the first set of emergency data sharing criteria and the second set of emergency data sharing criteria are associated with the emergency response entity link between the first emergency response entity and the second emergency response entity.

13. The method of claim 12, further comprising:

determining at least a portion of the first set of emergency data sharing criteria and at least a portion of the second set of emergency data sharing criteria in response to establishment of the emergency response entity link between the first emergency response entity and the second emergency response entity.

14. The method of claim 12, wherein establishing the emergency response entity link between the first emergency response entity and the second emergency response entity-through the emergency response entity relationship management portal comprises:

receiving, through a first instance of the emergency response entity relationship management portal, a request to establish an emergency response entity link with the second emergency response entity from the first emergency response entity;

transmitting, through a second instance of the emergency response entity relationship management portal, the request to establish the emergency response entity link to the second emergency response entity; and receiving, through the second instance of the emergency response entity relationship management portal, confirmation of the request to establish the emergency response entity link from the second emergency response entity.

15. The method of claim 10, wherein the emergency response entity relationship management portal is accessible via a web browser.

16. The method of claim 1, wherein the first software application and the second software application are computer aided dispatch (CAD) software applications.

17. The method of claim 1, wherein the first emergency response entity and the second emergency response entity are public safety answering points (PSAPs).

18. An emergency data exchange system configured to facilitate an exchange of emergency data between various emergency response entities, the emergency data exchange system comprising:

a plurality of policy store databases, each policy store database corresponding to, and storing emergency data sharing criteria for, a specific emergency response entity that is operatively coupled to the emergency data exchange system;

a network component; and at least one processor, operatively coupled to the plurality of policy store databases, and to the network component, and operative to:

establish a first communication link between the emergency data exchange system and a first software application executed on a first computing device at a first emergency response entity and establish a second communication link between the emergency data exchange system and a second software application executed on a second computing device at a second emergency response entity;

determine via a first policy store associated with the first emergency response entity, and via a second policy store associated with the second emergency response entity, the first policy store and the second policy store contained within the plurality of policy store databases, a first set of emergency data sharing criteria regarding the second emergency response entity and a second set of emergency data sharing criteria regarding the first emergency response entity;

receive, by the emergency data exchange system, emergency data from the first software application via the first communication link;

determine, by the emergency data exchange system via the first policy store and via the second policy store, that the emergency data satisfies both the first set of emergency data sharing criteria from the first policy store, and the second set of emergency data sharing criteria from the second policy store; and transmit the emergency data to the second software application at the second emergency response entity via the second communication link, in response to determining that the emergency data satisfies both the first set of emergency data sharing criteria from the first policy store, and the second set of emergency data sharing criteria from the second policy store.

19. The system of claim 18, further comprising:

a message bus;

a first emergency response entity account module associated with the first emergency response entity and configured to receive the emergency data from the first software application via the first communication link and publish the emergency data to the message bus; and a second emergency response entity account module associated with the second emergency response entity and configured to receive the emergency data from the message bus and transmit the emergency data to the second software application via the second communication link.

20. The system of claim 19, wherein the first set of emergency data sharing criteria is stored within the first emergency response entity account module and wherein the second set of emergency data sharing criteria is stored within the second emergency response entity account module, each emergency response entity account module comprising a policy store database of the plurality of policy store databases.

* * * * *